United States Patent
Coralli et al.

(10) Patent No.: US 8,611,311 B2
(45) Date of Patent: *Dec. 17, 2013

(54) METHOD AND APPARATUS FOR CANCELING PILOT INTERFERENCE IN A WIRELESS COMMUNICATION SYSTEM

(75) Inventors: Alessandro Vanelli Coralli, Bologna (IT); Henry David Pfister, San Diego, CA (US); Jilei Hou, Carlsbad, CA (US); John Edward Smee, San Diego, CA (US); Roberto Padovani, San Diego, CA (US); Brian K Butler, La Jolla, CA (US); Jeffrey A Levin, San Diego, CA (US); Thomas B Wilborn, San Diego, CA (US); Paul E Bender, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 563 days.

This patent is subject to a terminal disclaimer.

(21) Appl. No.: 11/173,504

(22) Filed: Jun. 30, 2005

(65) Prior Publication Data

US 2006/0007895 A1 Jan. 12, 2006

Related U.S. Application Data

(63) Continuation-in-part of application No. 09/974,935, filed on Oct. 10, 2001, now Pat. No. 7,190,749.

(60) Provisional application No. 60/296,259, filed on Jun. 6, 2001.

(51) Int. Cl.
*H03D 1/04* (2006.01)

(52) U.S. Cl.
USPC .......................... 370/335; 375/148; 375/346

(58) Field of Classification Search
USPC ........ 455/67.13; 370/210, 342, 335; 375/148, 375/144, 140, 346
See application file for complete search history.

(56) References Cited

U.S. PATENT DOCUMENTS

| 4,901,307 A | 2/1990 | Gilhousen et al. |
| 5,103,459 A | 4/1992 | Gilhousen et al. |

(Continued)

FOREIGN PATENT DOCUMENTS

| CN | 1397112 | 2/2003 |
| CN | 1554156 A | 12/2004 |

(Continued)

OTHER PUBLICATIONS

Song et al., "Optimum Partial Interference Canceling Factor in Pilot Assistant Coherent OFDM system with Partial Power Training Sequence Synchronization," Personal, Indoor and Mobile Radio Communications, 14th IEEE Proceedings, Piscataway, NJ, vol. 2, Sep. 2003, pp. 1906-1910.

(Continued)

*Primary Examiner* — Phuoc Doan
(74) *Attorney, Agent, or Firm* — Abdollah Katbab

(57) ABSTRACT

Methods and systems for estimating and canceling pilot interference in a wireless (e.g., CDMA) communication system. In one method, a received signal comprised of a number of signal instances, each including a pilot, is initially processed to provide data samples. Each signal instance's pilot interference may be estimated by despreading the data samples with a spreading sequence for the signal instance, channelizing the despread data to provide pilot symbols, filtering the pilot symbols to estimate the channel response of the signal instance, and multiplying the estimated channel response with the spreading sequence. The pilot interference estimates due to a plurality of interfering multipaths are accumulated to derive the total pilot interference, which is subtracted from the data samples to provide pilot-canceled data samples. These samples are then processed to derive demodulated data for each of at least one (desired) signal instance in the received signal.

51 Claims, 17 Drawing Sheets

(56) References Cited

U.S. PATENT DOCUMENTS

| | | |
|---|---|---|
| 5,490,165 A | 2/1996 | Blakeney, II et al. |
| 5,506,865 A | 4/1996 | Weaver, Jr. |
| 5,644,591 A | 7/1997 | Sutton |
| 5,703,905 A | 12/1997 | Langberg |
| 5,764,687 A | 6/1998 | Easton |
| 5,781,543 A | 7/1998 | Ault et al. |
| 5,789,973 A | 8/1998 | Barrett, Jr. et al. |
| 5,805,648 A | 9/1998 | Sutton |
| 5,812,600 A | 9/1998 | Hess et al. |
| 5,953,369 A | 9/1999 | Suzuki |
| 6,002,715 A | 12/1999 | Brailean et al. |
| 6,009,089 A | 12/1999 | Huang et al. |
| 6,032,026 A | 2/2000 | Seki et al. |
| 6,034,986 A | 3/2000 | Yellin |
| 6,067,292 A | 5/2000 | Huang et al. |
| 6,067,333 A | 5/2000 | Kim et al. |
| 6,122,309 A | 9/2000 | Bergstrom et al. |
| 6,131,013 A | 10/2000 | Bergstrom et al. |
| 6,137,788 A | 10/2000 | Sawahashi et al. |
| 6,137,843 A | 10/2000 | Chennakeshu et al. |
| 6,154,443 A | 11/2000 | Huang et al. |
| 6,175,587 B1 | 1/2001 | Madhow et al. |
| 6,201,799 B1 | 3/2001 | Huang et al. |
| 6,233,229 B1 | 5/2001 | Ranta et al. |
| 6,259,724 B1 | 7/2001 | Esmallzadeh |
| 6,295,289 B1 | 9/2001 | Ionescu et al. |
| 6,333,947 B1 | 12/2001 | van Heeswyk et al. |
| 6,393,302 B1 | 5/2002 | O'Byrnee et al. |
| 6,459,693 B1 | 10/2002 | Park et al. |
| 6,459,694 B1 | 10/2002 | Sari et al. |
| 6,493,541 B1 | 12/2002 | Gunnarsson et al. |
| 6,496,706 B1 | 12/2002 | Jouu et al. |
| 6,498,784 B1 | 12/2002 | Ozluturk et al. |
| 6,570,909 B1 | 5/2003 | Kansakoski et al. |
| 6,574,211 B2 | 6/2003 | Padovani et al. |
| 6,580,899 B1 | 6/2003 | Dalgleish et al. |
| 6,603,743 B2 | 8/2003 | Ozluturk et al. |
| 6,618,429 B2 | 9/2003 | Gilhousen et al. |
| 6,621,804 B1 | 9/2003 | Holtzmann et al. |
| 6,642,883 B2 | 11/2003 | Jacomb-Hood et al. |
| 6,654,408 B1 | 11/2003 | Kadous et al. |
| 6,661,835 B1 | 12/2003 | Sugimoto et al. |
| 6,680,727 B2 | 1/2004 | Butler et al. |
| 6,683,908 B1 | 1/2004 | Cleveland |
| 6,690,712 B2 | 2/2004 | Kim et al. |
| 6,697,347 B2 | 2/2004 | Ostman et al. |
| 6,788,733 B1 | 9/2004 | Whang et al. |
| 6,832,073 B2 | 12/2004 | Jang et al. |
| 6,850,506 B1 | 2/2005 | Holtzmann et al. |
| 6,865,218 B1 | 3/2005 | Sourour |
| 6,917,642 B1 | 7/2005 | Rouphael et al. |
| 6,940,827 B2 | 9/2005 | Li et al. |
| 6,950,411 B2 | 9/2005 | Ozluturk et al. |
| 6,961,362 B2 | 11/2005 | Ariyoshi et al. |
| 6,975,666 B2 | 12/2005 | Affes et al. |
| 6,996,069 B2 | 2/2006 | Willenegger |
| 6,999,430 B2 | 2/2006 | Holtzman et al. |
| 6,999,794 B1 | 2/2006 | Lindskog et al. |
| 7,035,284 B2 | 4/2006 | Willenegger et al. |
| 7,042,968 B1 | 5/2006 | Jansen et al. |
| 7,061,967 B2 | 6/2006 | Schelm et al. |
| 7,068,637 B2 | 6/2006 | Saito et al. |
| 7,069,034 B1 | 6/2006 | Sourour |
| 7,072,321 B2 | 7/2006 | Holtzmann et al. |
| 7,072,322 B2 | 7/2006 | Holtzmann et al. |
| 7,099,378 B2 | 8/2006 | Dunyak et al. |
| 7,103,094 B2 | 9/2006 | Lotter et al. |
| 7,120,447 B1 | 10/2006 | Chheda et al. |
| 7,126,928 B2 | 10/2006 | Tiedemann et al. |
| 7,139,306 B2 | 11/2006 | Oates |
| 7,158,560 B2 | 1/2007 | Cleveland |
| 7,164,739 B1 | 1/2007 | Trott |
| 7,177,344 B2 | 2/2007 | Oates |
| 7,190,749 B2 | 3/2007 | Levinn et al. |
| 7,197,282 B2 | 3/2007 | Dent et al. |
| 7,203,220 B2 | 4/2007 | Baltersee et al. |
| 7,206,554 B1 | 4/2007 | Lindskog et al. |
| 7,209,515 B2 | 4/2007 | Kilfoyle et al. |
| 7,221,699 B1 | 5/2007 | Lindskog et al. |
| 7,245,600 B2 | 7/2007 | Chen |
| 7,254,171 B2 | 8/2007 | Hudson |
| 7,254,197 B2 | 8/2007 | Heo et al. |
| 7,257,101 B2 | 8/2007 | Petrus et al. |
| 7,263,082 B1 | 8/2007 | Lindskog et al. |
| 7,269,389 B2 | 9/2007 | Petrus et al. |
| 7,292,552 B2 | 11/2007 | Willenegger et al. |
| 7,295,597 B2 | 11/2007 | Fitton et al. |
| 7,299,402 B2 | 11/2007 | Soong et al. |
| 7,317,750 B2 | 1/2008 | Shattil |
| 7,321,780 B2 | 1/2008 | Love et al. |
| 7,333,420 B2 | 2/2008 | Higuchi et al. |
| 7,336,930 B2 | 2/2008 | Larsson et al. |
| 7,352,725 B2 | 4/2008 | Tiirola et al. |
| 7,391,803 B2 | 6/2008 | Hess et al. |
| 7,394,792 B1 | 7/2008 | Von Der Embse |
| 7,394,879 B2 | 7/2008 | Narayan et al. |
| 7,406,065 B2 | 7/2008 | Willenegger et al. |
| 7,437,135 B2 | 10/2008 | Pan et al. |
| 7,450,536 B2 | 11/2008 | Li et al. |
| 7,486,726 B2 | 2/2009 | Alexander et al. |
| 7,486,750 B1 | 2/2009 | Baier et al. |
| 7,515,877 B2 | 4/2009 | Chen et al. |
| 7,623,553 B2 | 11/2009 | Bhushan et al. |
| 7,903,770 B2 | 3/2011 | Levin et al. |
| 8,099,123 B2 | 1/2012 | Tomasin et al. |
| 8,385,388 B2 | 2/2013 | Soriaga et al. |
| 8,406,695 B2 | 3/2013 | Hou et al. |
| 2001/0019961 A1 | 9/2001 | Nakahara et al. |
| 2001/0040874 A1 | 11/2001 | Saito et al. |
| 2002/0021682 A1 | 2/2002 | Ariyoshi et al. |
| 2002/0051433 A1 | 5/2002 | Affes et al. |
| 2002/0118727 A1* | 8/2002 | Kim et al. ............ 375/146 |
| 2002/0154717 A1 | 10/2002 | Shima et al. |
| 2002/0186755 A1 | 12/2002 | Kim et al. |
| 2003/0021334 A1 | 1/2003 | Levin et al. |
| 2003/0035404 A1 | 2/2003 | Ozluturk et al. |
| 2003/0052819 A1 | 3/2003 | Jacomb-Hood et al. |
| 2003/0142655 A1 | 7/2003 | Higuchi et al. |
| 2003/0202568 A1 | 10/2003 | Choi et al. |
| 2003/0227962 A1 | 12/2003 | Hintz-Madsen |
| 2003/0235238 A1 | 12/2003 | Schelm et al. |
| 2004/0001429 A1 | 1/2004 | Ma et al. |
| 2004/0062302 A1 | 4/2004 | Fujii et al. |
| 2004/0077322 A1 | 4/2004 | Garmonov et al. |
| 2004/0120282 A1 | 6/2004 | Ozluturk et al. |
| 2004/0146024 A1 | 7/2004 | Li et al. |
| 2004/0160924 A1* | 8/2004 | Narayan et al. ............ 370/335 |
| 2004/0184251 A1 | 9/2004 | Thomas et al. |
| 2004/0192208 A1 | 9/2004 | Kong et al. |
| 2004/0202104 A1 | 10/2004 | Ishii et al. |
| 2004/0219920 A1 | 11/2004 | Love et al. |
| 2004/0252753 A1 | 12/2004 | Li et al. |
| 2005/0002445 A1 | 1/2005 | Dunyak et al. |
| 2005/0013350 A1 | 1/2005 | Coralli et al. |
| 2005/0041626 A1 | 2/2005 | Tiirola et al. |
| 2005/0047484 A1 | 3/2005 | He et al. |
| 2005/0063332 A1 | 3/2005 | Holtzman et al. |
| 2005/0094675 A1 | 5/2005 | Bhushan et al. |
| 2005/0185701 A1 | 8/2005 | George |
| 2005/0192042 A1 | 9/2005 | Au et al. |
| 2005/0243898 A1 | 11/2005 | Reznik et al. |
| 2006/0034218 A1 | 2/2006 | Ozluturk et al. |
| 2006/0062283 A1 | 3/2006 | Zhang et al. |
| 2006/0115014 A1 | 6/2006 | Jeong et al. |
| 2006/0141933 A1 | 6/2006 | Smee et al. |
| 2006/0141934 A1 | 6/2006 | Pfister et al. |
| 2006/0141935 A1 | 6/2006 | Hou et al. |
| 2006/0142041 A1 | 6/2006 | Tomasin et al. |
| 2006/0229017 A1 | 10/2006 | Larssonn et al. |
| 2007/0002724 A1 | 1/2007 | Khan |
| 2007/0004337 A1 | 1/2007 | Biswas et al. |
| 2007/0093261 A1 | 4/2007 | Hou et al. |
| 2007/0111664 A1 | 5/2007 | Levin et al. |
| 2007/0115890 A1 | 5/2007 | Yi et al. |

(56) References Cited

U.S. PATENT DOCUMENTS

| | | |
|---|---|---|
| 2007/0127558 A1 | 6/2007 | Banister |
| 2007/0135051 A1 | 6/2007 | Zheng et al. |
| 2007/0147329 A1 | 6/2007 | Soriaga et al. |
| 2007/0165704 A1 | 7/2007 | Yang et al. |
| 2008/0032630 A1 | 2/2008 | Kim et al. |
| 2008/0130714 A1 | 6/2008 | Wilborn et al. |
| 2011/0069736 A1 | 3/2011 | Coralli et al. |

FOREIGN PATENT DOCUMENTS

| | | |
|---|---|---|
| EP | 0 954 112 A2 | 3/1999 |
| EP | 0 980 149 A2 | 2/2000 |
| EP | 1229668 | 8/2002 |
| EP | 1244232 A1 | 9/2002 |
| EP | 1365518 A1 | 11/2003 |
| GB | 2 384 660 A | 7/2003 |
| JP | 10247894 A | 9/1998 |
| JP | 11317725 A | 11/1999 |
| JP | 2000115131 A | 4/2000 |
| JP | 2000278204 A | 10/2000 |
| JP | 2001186106 A | 7/2001 |
| JP | 2001211104 A | 8/2001 |
| JP | 2001251242 A | 9/2001 |
| JP | 2002044017 A | 2/2002 |
| JP | 2002044053 A | 2/2002 |
| JP | 2002217871 A | 8/2002 |
| JP | 2002535915 | 10/2002 |
| JP | 2003264501 A | 9/2003 |
| JP | 2004535083 T | 11/2004 |
| JP | 2005519567 A | 6/2005 |
| JP | 2005198223 A | 7/2005 |
| KR | 19980081861 | 11/1998 |
| KR | 0326183 | 6/2002 |
| KR | 2004-28772 | 4/2004 |
| KR | 1020040045102 | 6/2004 |
| RU | 2216851 | 11/2003 |
| RU | 2002115625 | 2/2004 |
| WO | WO9642146 A1 | 12/1996 |
| WO | 0025442 | 5/2000 |
| WO | WO0049724 A1 | 8/2000 |
| WO | 0158046 | 8/2001 |
| WO | WO 02/33840 A2 | 4/2002 |
| WO | 0239597 | 5/2002 |
| WO | 02039597 | 5/2002 |
| WO | WO0245288 A2 | 6/2002 |
| WO | 0282681 | 10/2002 |
| WO | 02082681 | 10/2002 |
| WO | WO02080432 A2 | 10/2002 |
| WO | WO 02/99992 A1 | 12/2002 |
| WO | 2004045239 | 5/2004 |
| WO | 2004064304 | 7/2004 |
| WO | 2004070958 | 8/2004 |
| WO | 2004100416 A1 | 11/2004 |
| WO | 2004114535 A1 | 12/2004 |
| WO | 2005025118 A1 | 3/2005 |

OTHER PUBLICATIONS

Iwakiri, N. "Interference Reduction Efficiency of a Turbo Coded CDMA Multilayer System Equipped with a Pilot Canceler," *Vehicular Technology Conference*, vol. 1, Sep. 1999, pp. 391-395.
International Search Report-PCT-US02/018133_International Search Authority-European Patent Office-Sep. 30, 2002.
International Search Report-13 PCT/US05/023307, International Search Authority—European Patent Office—Oct. 28, 2005.
3GPP2, TSG-C: "cdma2000 High Rate Packet Data Air Interface Specification" (online) Mar. 2004, Ver., 1.0 pp. 14-65, XP002382113.
Tinnakornsrisuphap et al., "On the Fairness and Stability of the Reverse-Link MAC Layer in CDMA2000 1XEV-Do" Communications, 2004 IEEE International Conference on Paris France Jun. 20-24, 2004, Piscataway NJ, USA, IEEE Jun. 20, 2004, pp. 144-148, XP010710.
International Preliminary Examination Report—PCT/US2002/018133, International Preliminary Examination Authority—US—Nov. 17, 2003.
Written Opinion—PCT/US05/023307, International Search Authority—European Patent Office—Oct. 28, 2005.
International Preliminary Report on Patentability—PCT/US2005/023307, International Preliminary Examination Authority, US—Mar. 18, 2007.
3GPP2, TSG-C: "cdma2000 High Rate Packet Data Air Interface Specification" (online) Mar. 2004, Ver. 1.0, pp. 14-65, XP002382113.
Tinnakornsrisuphap et al. "On the Fairness and Stability of the Reverse-Link MAC layer in CDMA2000 1XEV-Do" Communications, 2004 IEEE International Conference on Paris, France Jun. 20-24, 2004, Piscataway, NJ, USA, IEEE, Jun. 20, 2004 pp. 144-148, XP010710.
cdma2000 High Rate Packet Data Air Interface Specification, 3GPP2C. S0024-A V1.0, Mar. 2004, p. 14-1 to p. 14-65.
Daisuke Takeda, Takashi Wakutsu, and Mutsumu Serizawa, "Performance of Feedback Parallel Canceller Using Turbo Code in Multipath Fading Channel," Technical Report of IEICE. RCS, Radio Communications System, The Institute of Electronics, Information and Communication Engineers, Oct. 12, 2001, 101 (370), p. 63-68.
Miki, et al., "Multipath Interference Canceller Using Sofidecision Replica Combined with Hybrid ARQ in W-CDMA Forward Link," IEEE 54TH Vehicular Technology Conference, Proceedings, Atlantic City, NJ, USA Oct. 7-11, 2001, pp. 1922-1926, vol. 1 of 4, IEEE Vehicular Technology Conference, Conf. 54, New York, NY, USA, XP010562300.
Shousei Yoshida, and Akihisa Ushirokawa, "CDMA Multi-Stage Interference Canceller with Recursive Channel Estimation Based on Symbol Replica Processing," Technical Report of IEICE. RCS, Radio Communications System, The Institute of Electronics, Information and Communication Engineers, Feb. 20, 1997, 96(530), p. 57-62.
Wang Y. et al., "Multipath Intereference Cancellation Scheme for Multicode CDMA Systems in Multipath Fading Channels", IEEE Communications Society, Mar. 2004, pp. 1817-1822.
Yoshihisa Kishiyama, Koichi Okawa, and Mamoru Sawahashi, "Experiments on Parallel-type Coherent Multi-stage Interference Canceller with Channel Estimation Using Pilot and Decision-feedback Data Symbols in W-CDMA Reverse Link," Technical Report of IEICE. RCS, Radio Communications System, The Institute of Electronics, Information and Communication Engineers, Oct. 6, 2000, 100(346), p. 13-19.
Han, B., "OFDM systems iterative joint channel estimation and symbol detection algorithm", Communication Technology, vol. 24, No. 8, section 2-3, Aug. 2003.
Andrew J. Viterbi., "CDMA: Principles of Spread Spectrum Communications", Chapter 4, Addison Wesley Longman, Reading, MA., pp. 77-121, 1995.
Jakes W. C., "Microwave Mobile Communications", IEEE, 1974, pp. 11-78, Chapter 1, John Wiley & Sons, New York.
TIA/EIA Interim Standard; Mobile Station-Base Station Compatibility Standard for Dual-Mode Wideband Spread Spectrum Cellular System; TIA/EIA/IS-95-A Revision of TIA/EIA/IS-95, May 1995. (Part 1 pp. 1-351).
TIA/EIA Interim Standard; Mobile Station-Base Station Compatibility Standard for Dual-Mode Wideband Spread Spectrum Cellular System; TIA/EIA/IS-95-A Revision of TIA/EIA/IS-95, May 1995. (Part 2 pp. 352-744).

\* cited by examiner

| $X=2048(h_m^2)/(Nt)$ | Cancellation factor $\alpha_m$ |
|---|---|
| 0 | 0 |
| 1 | 0.5 |
| 2 | 0.6667 |
| 3 | .7500 |
| 4 | .8000 |
| 5 | .8333 |
| 6 | .8571 |
| 7 | .8750 |
| 8 | .8889 |
| 9 | .9000 |
| 10 | .9091 |
| 11 | .9167 |
| 12 | .9231 |
| 13 | .9286 |
| 14 | .9333 |
| 15 | .9375 |

FIG. 10

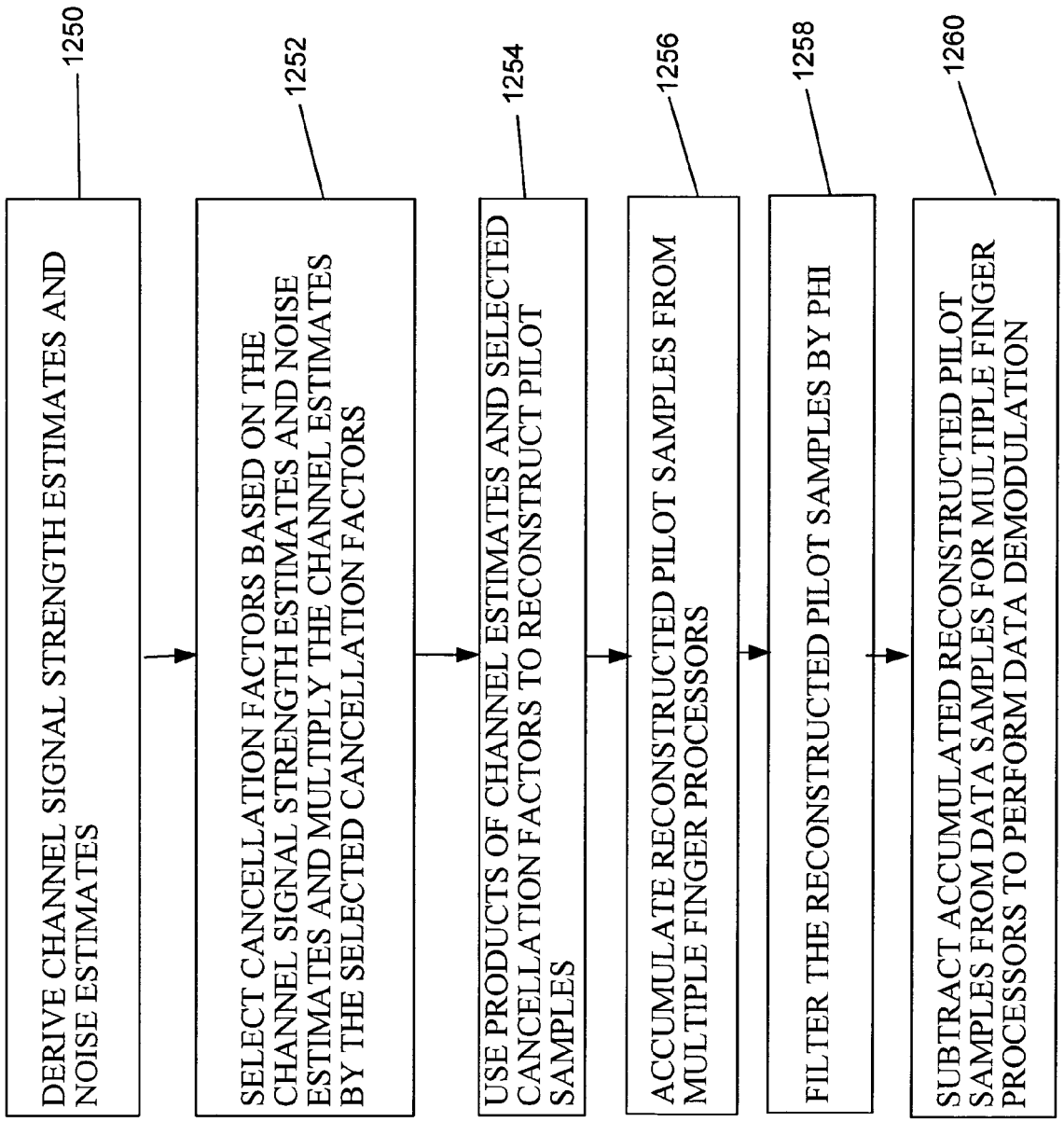

METHOD AND APPARATUS FOR CANCELING PILOT INTERFERENCE IN A WIRELESS COMMUNICATION SYSTEM

CLAIM OF PRIORITY UNDER 35 U.S.C. §120

The present Application for Patent is a Continuation in Part and claims priority to patent application Ser. No. 09/974,935, entitled "METHOD AND APPARATUS FOR CANCELING PILOT INTERFERENCE IN A WIRELESS COMMUNICATION SYSTEM," filed Oct. 10, 2001, of which is assigned to the assigned to the assignee hereof and hereby expressly incorporated by reference herein.

BENEFIT OF EARLIER FILING DATE UNDER 35 U.S.C. §119

The present application for patent claims benefit of the Provisional Application No. 60/584,527, entitled "METHOD AND APPARATUS FOR CANCELING PILOT INTERFERENCE IN A WIRELESS COMMUNICATION SYSTEM," filed Jun. 30, 2004, and claims priority to Provisional Application No. 60/296,259 entitled "METHOD AND APPARATUS FOR CANCELLATION OF MULTIPLE PILOT SIGNALS," filed Jun. 6, 2001, both applications of which are assigned to the assignee hereof and hereby expressly incorporated by reference herein.

BACKGROUND

1. Field

The present disclosure relates generally to data communication, and more specifically to techniques for canceling interference due to pilots in a wireless (e.g., CDMA) communication system.

2. Background

Wireless communication systems are widely deployed to provide various types of communication such as voice, packet data, and so on. These systems may be based on code division multiple access (CDMA), time division multiple access (TDMA), or some other multiple access technique. CDMA systems may provide certain advantages over other types of systems, including increased system capacity. A CDMA system is typically designed to implement one or more standards, such as IS-95, cdma2000, IS-856, W-CDMA, and TS-CDMA standards, all of which are known in the art.

In some wireless (e.g., CDMA) communication systems, a pilot may be transmitted from a transmitter unit (e.g., a terminal) to a receiver unit (e.g., a base station) to assist the receiver unit to perform a number of functions. For example, the pilot may be used at the receiver unit for synchronization with the timing and frequency of the transmitter unit, estimation of the channel response and the quality of the communication channel, coherent demodulation of data transmission, and so on. The pilot is typically generated based on a known data pattern (e.g., a sequence of all zeros) and using a known signal processing scheme (e.g., channelized with a particular channelization code and spread with a known spreading sequence).

On the reverse link in a cdma2000 system, the spreading sequence for each terminal is generated based on (1) a complex pseudo-random noise (PN) sequence common to all terminals and (2) a scrambling sequence specific to the terminal. In this way, the pilots from different terminals may be identified by their different spreading sequences. On the forward link in cdma2000 and IS-95 systems, each base station is assigned a specific offset of the PN sequence. In this way, the pilots from different base stations may be identified by their different assigned PN offsets.

At the receiver unit, a rake receiver is often used to recover the transmitted pilot, signaling, and traffic data from all transmitter units that have established communication with the receiver unit. A signal transmitted from a particular transmitter unit may be received at the receiver unit via multiple signal paths, and each received signal instance (or multipath) of sufficient strength may be individually demodulated by the rake receiver. Each such multipath is processed in a manner complementary to that performed at the transmitter unit to recover the data and pilot received via this multipath. The recovered pilot has an amplitude and phase determined by, and indicative of, the channel response for the multipath. The pilot is typically used for coherent demodulation of various types of data transmitted along with the pilot, which are similarly distorted by the channel response. For each transmitter unit, the pilots for a number of multipaths for the transmitter unit are also used to combine demodulated symbols derived from these multipaths to obtain combined symbols having improved quality.

On the reverse link, the pilot from each transmitting terminal acts as interference to the signals from all other terminals. For each terminal, the aggregate interference due to the pilots transmitted by all other terminals may be a large percentage of the total interference experienced by this terminal. This pilot interference can degrade performance (e.g., a higher packet error rate) and further reduce the reverse link capacity.

There is therefore a need for techniques to cancel interference due to pilots in a wireless (e.g., CDMA) communication system.

SUMMARY

Aspects of the present invention provide techniques for estimating and canceling pilot interference in a wireless (e.g., CDMA) communication system. A received signal typically includes a number of signal instances (i.e., multipaths). For each multipath to be demodulated (i.e., each desired multipath), the pilots in all multipaths are interference to the data in the desired multipath. If the pilot is generated based on a known data pattern (e.g., a sequence of all zeros) and channelized with a known channelization code (e.g., a Walsh code of zero), then the pilot in an interfering multipath may be estimated as simply a spreading sequence with a phase corresponding to the arrival time of that multipath at the receiver unit. The pilot interference from each interfering multipath may be estimated based on the spreading sequence and an estimate of the channel response of that multipath (which may be estimated based on the pilot). The total pilot interference due to a number of interfering multipaths may be derived and subtracted from the received signal to provide a pilot-canceled signal having the pilot interference removed.

In one specific embodiment, a method for canceling pilot interference at a receiver unit (e.g., a base station) in a wireless (e.g., cdma2000) communication system is provided. In accordance with the method, a received signal comprised of a number of signal instances, each of which includes a pilot, is initially processed to provide data samples. The data samples are then processed to derive an estimate of the pilot interference due to each of one or more (interfering) signal instances, and the pilot interference estimates are further combined to derive the total pilot interference. The total pilot interference is then subtracted from the data samples to provide pilot-canceled data samples, which are further processed to derive demodulated data for each of at least one (desired) signal instance in the received signal.

The pilot interference due to each interfering signal instance may be estimated by (1) despreading the data samples with a spreading sequence for the signal instance, (2) channelizing the despread samples with a pilot channelization code to provide pilot symbols, (3) filtering the pilot symbols to provide an estimated channel response of the signal instance, and (4) multiplying the spreading sequence for the signal instance with the estimated channel response to provide the estimated pilot interference. The data demodulation for each desired multipath may be performed by (1) despreading the pilot-canceled data samples with the spreading sequence for the signal instance, (2) channelizing the despread samples with a data channelization code to provide data symbols, and (3) demodulating the data symbols to provide the demodulated data for the signal instance. For improved performance, the pilot estimation and cancellation may be performed at a sample rate that is higher than the PN chip rate.

Another system and method for pilot interference cancellation may comprise determining a channel estimate and noise estimate of a multipath, selecting a cancellation factor based on the multipath's channel estimate and noise estimate, multiplying the channel estimate by the selected cancellation factor, multiplying the product of the channel estimate and cancellation factor by a pre-computed convolution of a transmit pulse and a receive filter, performing a convolution of a spread pilot signal (e.g., a PN sequence) and a weighted filter (i.e., the product of the channel estimate, cancellation factor and the pre-computed convolution) to reconstruct pilot samples, accumulating reconstructed pilot samples from multiple finger processors and subtracting the accumulated reconstructed pilot samples from data samples to perform data demodulation. The order of these processes may vary.

Various aspects, embodiments, and features of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIG. 10 is an example of a lookup table which may be used by the finger processor of FIG. 9;

FIG. 12B is a flow diagram of yet another embodiment of a process to derive accumulated pilot interference for a number of multipaths;

DETAILED DESCRIPTION

Figure 1:
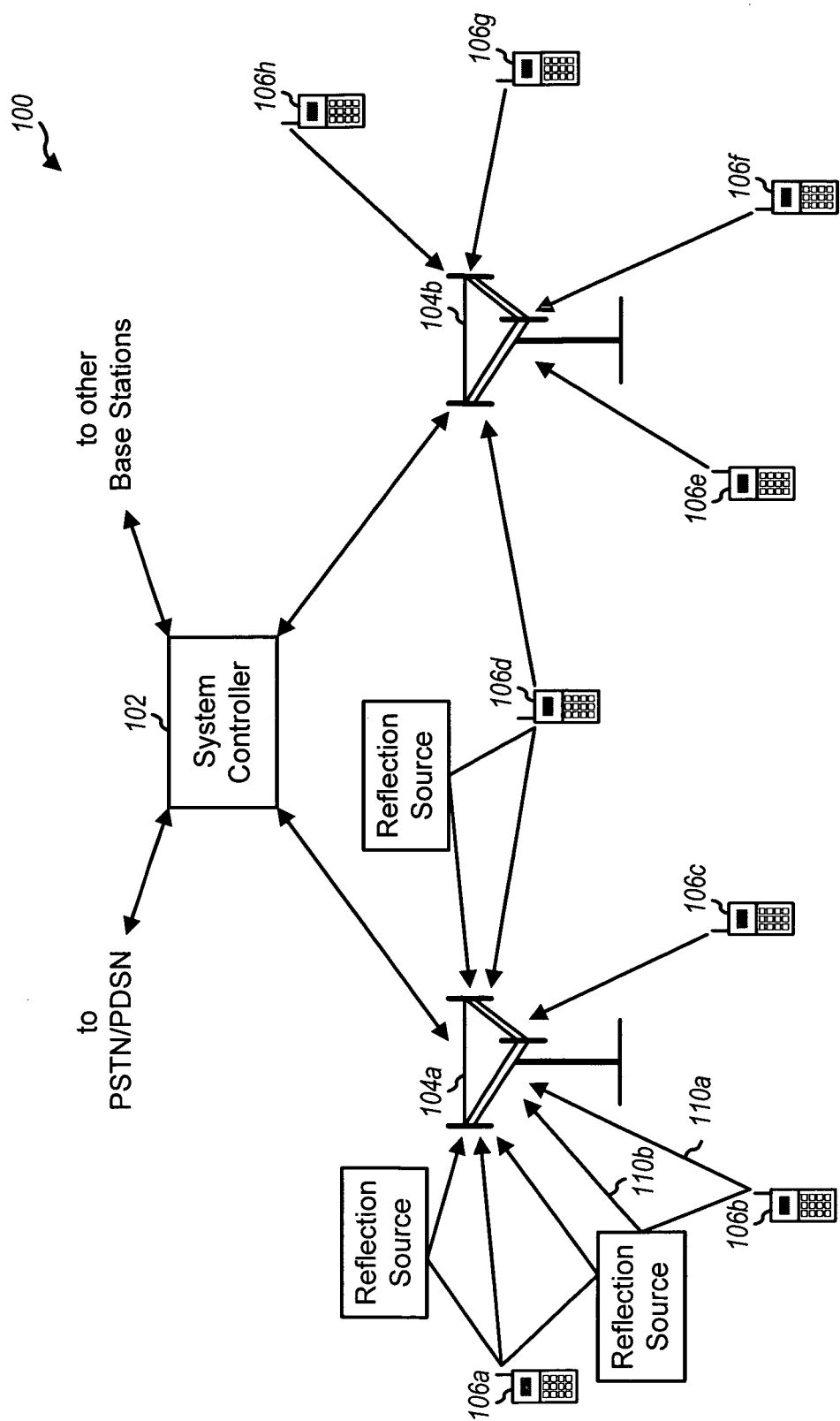
FIG. 1 is a diagram of a wireless communication system.

A signal transmitted from a terminal may reach a base station via one or multiple signal paths. These signal paths may include a straight path (e.g., signal path 110a) and reflected paths (e.g., signal path 110b). A reflected path is created when the transmitted signal is reflected off a reflection source and arrives at the base station via a different path than the line-of-sight path. The reflection sources are typically artifacts in the environment in which the terminal is operating (e.g., buildings, trees, or some other structures). The signal received by each antenna at the base station may thus comprise a number of signal instances (or multipaths) from one or more terminals.

In system 100, a system controller 102 (which is also often referred to as a base station controller (BSC)) couples to base stations 104, provides coordination and control for the base stations coupled to it, and further controls the routing of calls to terminals 106 via the coupled base stations. System controller 102 may further couple to a public switched telephone network (PSTN) via a mobile switching center (MSC), and to a packet data network via a packet data serving node (PDSN), which are not shown in FIG. 1. System 100 may be designed to support one or more CDMA standards, such as IS-95, CDMA2000, CDMA 2000 1xEV-DV, CDMA 2000 1xEV-DO (IS-856,), WCDMA, TD-SCDMA, TS-CDMA, or some other CDMA standards, or a combination thereof.

Various aspects and embodiments of the present disclosure may be applied for the forward and reverse links in various wireless communication systems. For clarity, the pilot interference cancellation techniques are specifically described for the reverse link in a cdma2000 system.

Figure 2:
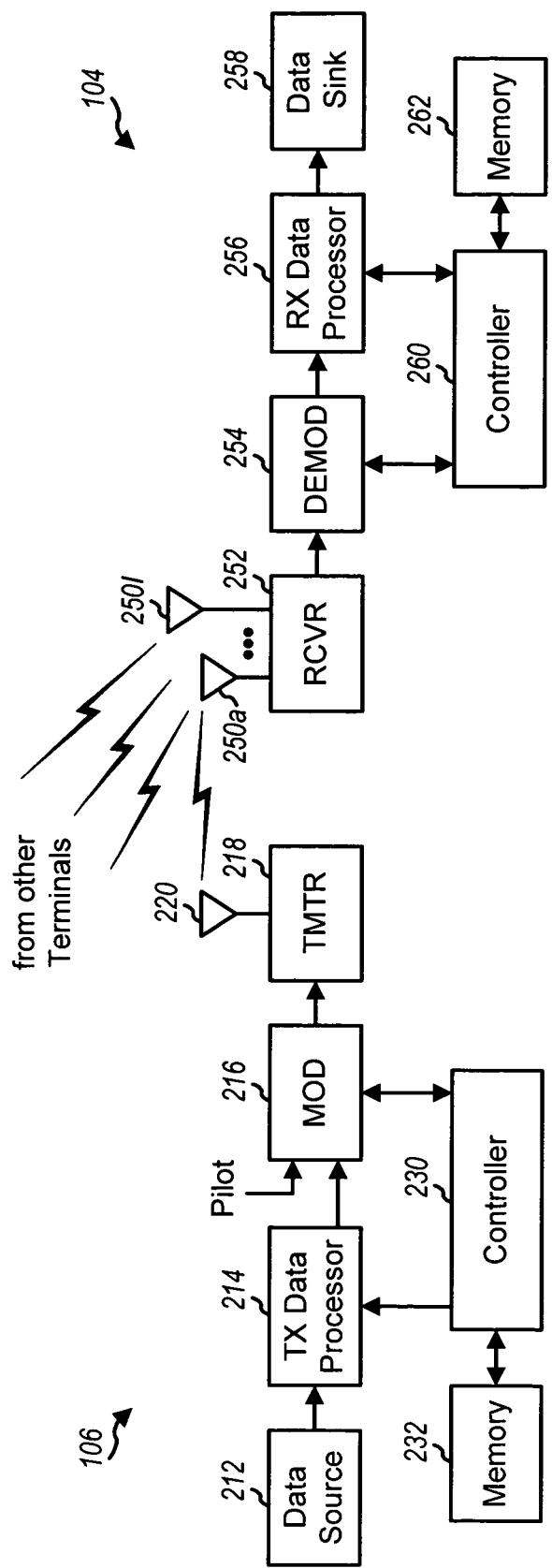
FIG. 2 is a simplified block diagram of an embodiment of a base station and a terminal.

FIG. 2 is a simplified block diagram of an embodiment of base station 104 and terminal 106. On the reverse link, at terminal 106, a transmit (TX) data processor 214 receives various types of "traffic" such as user-specific data from a data source 212, messages, and so on. TX data processor 214 then formats and codes the different types of traffic based on one or more coding schemes to provide coded data. Each coding scheme may include any combination of cyclic redundancy check (CRC), convolutional, Turbo, block, and other coding, or no coding at all. Interleaving is commonly applied when error correcting codes are used to combat fading. Other coding schemes may include automatic repeat request (ARQ), hybrid ARQ, and incremental redundancy repeat techniques. Typically, different types of traffic are coded using different coding schemes. A modulator (MOD) 216 then receives pilot data and the coded data from TX data processor 214, and further processes the received data to generate modulated data.

Figure 3:
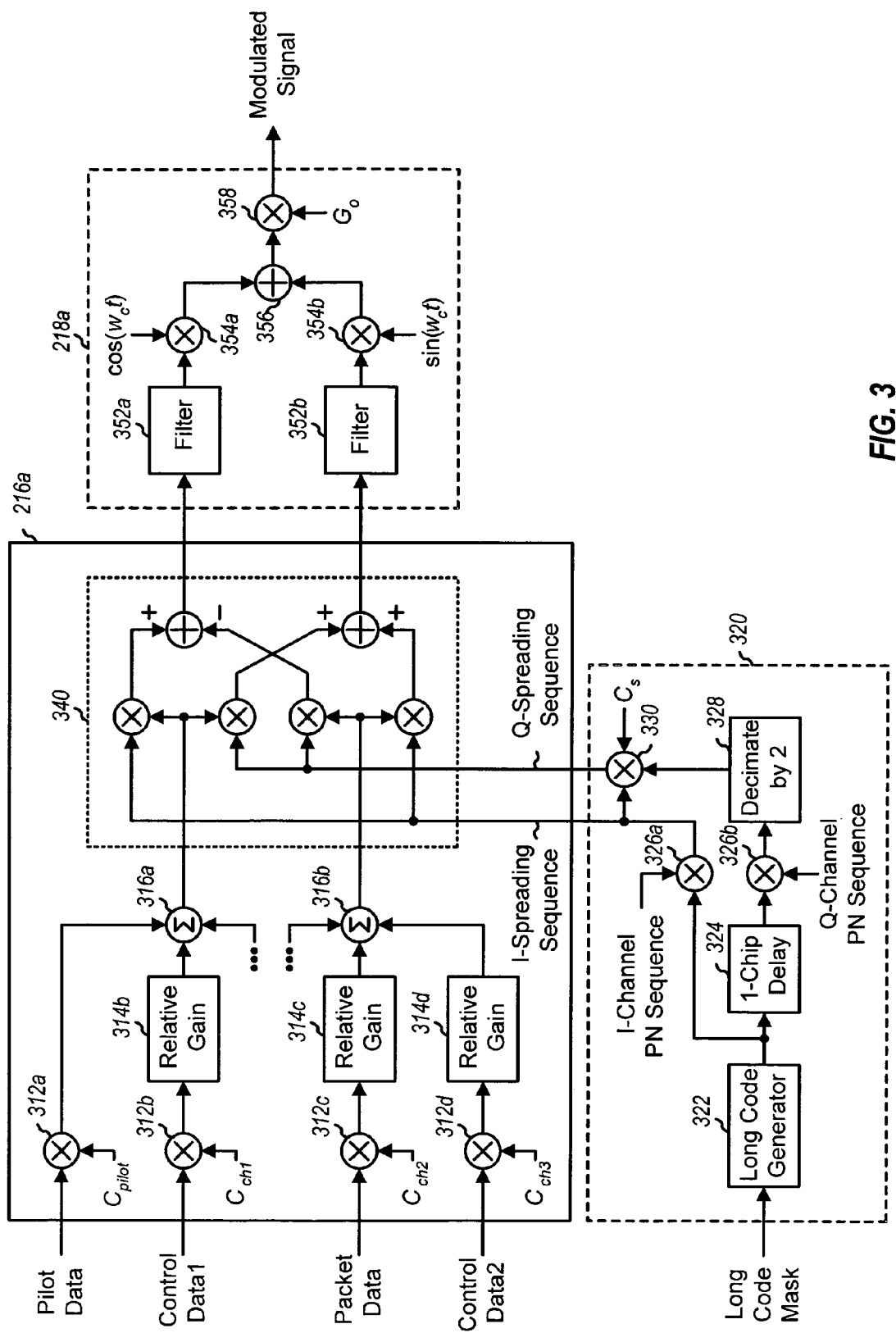
FIG. 3 is a block diagram of an embodiment of a modulator for the reverse link in cdma2000.

FIG. 3 is a block diagram of an embodiment of a modulator 216a, which may be used for modulator 216 in FIG. 2. For the reverse link in cdma2000, the processing by modulator 216a includes covering the data for each of a number of code channels (e.g., traffic, sync, paging, and pilot channels) with a respective Walsh code, $C_{chx}$, by a multiplier 312 to channelize the user-specific data (packet data), messages (control data), and pilot data onto their respective code channels. The channelized data for each code channel may be scaled with a respective gain, $G_i$, by a unit 314 to control the relative transmit power of the code channels. The scaled data for all code channels for the in-phase (I) path is then summed by a summer 316a to provide I-channel data, and the scaled data for all code channels for the quadrature (Q) path is summed by a summer 316b to provide Q-channel data.

FIG. 3 also shows an embodiment of a spreading sequence generator 320 for the reverse link in cdma2000. Within generator 320, a long code generator 322 receives a long code mask assigned to the terminal and generates a long pseudo-random noise (PN) sequence with a phase determined by the long code mask. The long PN sequence is then multiplied with an I-channel PN sequence by a multiplier 326a to generate an I spreading sequence. The long PN sequence is also delayed by a delay element 324, multiplied with a Q-channel PN sequence by a multiplier 326b, decimated by a factor of two by element 328, and covered with a Walsh code ($C_s$=+−) and further spread with the I spreading sequence by a multiplier 330 to generate a Q spreading sequence. The I-channel and Q-channel PN sequences form the complex short PN sequence used by all terminals. The I and Q spreading sequences form the complex spreading sequence, $S_k$, that is specific to the terminal.

Within modulator 216a, the I-channel data and the Q-channel data ($D_{chI}$+j$D_{chQ}$) are spread with the I and Q spreading sequences ($S_{kI}$+j$S_{kQ}$), via a complex multiply operation performed by a multiplier 340, to generate I spread data and Q spread data ($D_{spI}$+j$D_{spQ}$). The complex despreading operation may be expressed as:

$$D_{spI} + jD_{spQ} = (D_{chI} + jD_{chQ}) \cdot (S_{kI} + jS_{kQ}), \quad \text{Eq (1)}$$
$$= (D_{chI}S_{kI} - D_{chQ}S_{kQ}) + j(D_{chI}S_{kQ} + D_{chQ}S_{kI}).$$

The I and Q spread data comprises the modulated data provided by modulator 216a.

The modulated data is then provided to a transmitter (TMTR) 218a and conditioned. Transmitter 218a is an embodiment of transmitter 218 in FIG. 2. The signal conditioning includes filtering the I and Q spread data with filters 352a and 352b, respectively, and upconverting the filtered I and Q data with $\cos(w_c t)$ and $\sin(w_c t)$, respectively, by multipliers 354a and 354b. The I and Q components from multipliers 354a and 354b are then summed by a summer 356 and further amplified with a gain, $G_o$, by a multiplier 358 to generate a reverse link modulated signal.

Referring back to FIG. 2, the reverse link modulated signal is then transmitted via an antenna 220 over a wireless communication link to one or more base stations.

At base station 104, the reverse link modulated signals from a number of terminals are received by each of one or more antennas 250. Multiple antennas 250 may be used to provide spatial diversity against deleterious path effects such as fading. As an example, for a base station that supports three sectors, two antennas may be used for each sector and the base station may then include six antennas. Any number of antennas may thus be employed at the base station.

Each received signal is provided to a respective receiver (RCVR) 252, which conditions (e.g., filters, amplifies, down-converts) and digitizes the received signal to provide data samples for that received signal. Each receive signal may include one or more signal instances (i.e., multipaths) for each of a number of terminals.

A demodulator (DEMOD) 254 then receives and processes the data samples for all received signals to provide recovered symbols. For cdma2000, the processing by demodulator 254 to recover a data transmission from a particular terminal includes (1) despreading the data samples with the same spreading sequence used to spread the data at the terminal, (2) channelizing the despread samples to isolate or channelize the received data and pilot onto their respective code channels, and (3) coherently demodulating the channelized data with a recovered pilot to provide demodulated data. Demodulator 254 may implement a rake receiver that can process multiple signal instances for each of a number of terminals, as described below.

A receive (RX) data processor 256 then receives and decodes the demodulated data for each terminal to recover the user-specific data and messages transmitted by the terminal on the reverse link. The processing by demodulator 254 and RX data processor 256 is complementary to that performed by modulator 216 and TX data processor 214, respectively, at the terminal.

Figure 4:
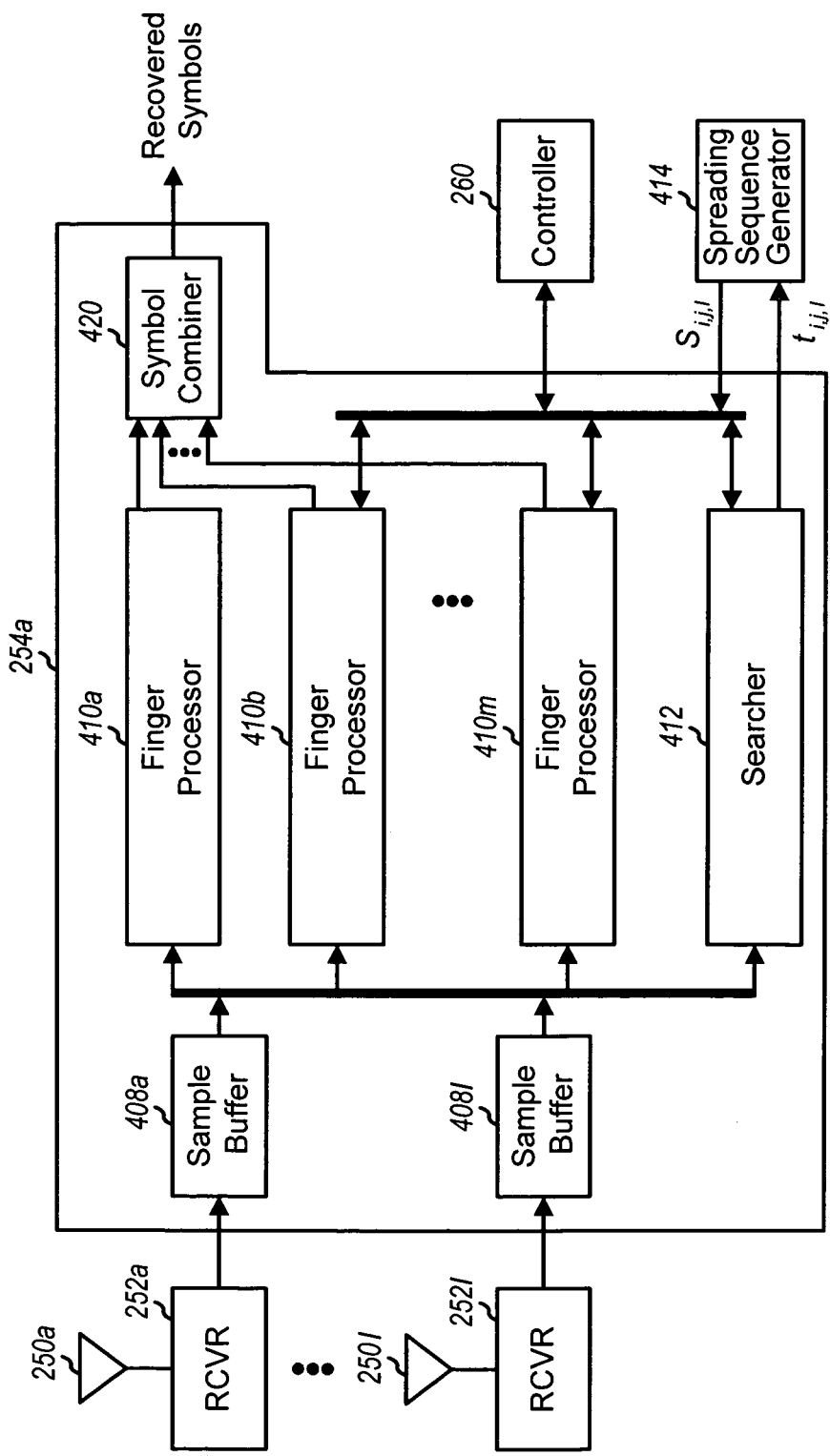
FIG. 4 is a block diagram of an embodiment of a rake receiver.

FIG. 4 is a block diagram of an embodiment of a rake receiver 254a, which is capable of receiving and demodulating the reverse link modulated signals from a number of terminals 106. Rake receiver 254a includes one or more (L) sample buffers 408, one or more (M) finger processors 410, a searcher 412, and a symbol combiner 420. The embodiment in FIG. 4 shows all finger processors 410 coupled to the same symbol combiner 420. In some configurations, there may be a large number of finger processors 410, such as 256 finger processors.

Due to the multipath environment, the reverse link modulated signal transmitted from each terminal 106 may arrive at base station 104 via a number of signal paths (as shown in FIG. 1), and the received signal for each base station antenna typically comprises a combination of different instances of the reverse link modulated signal from each of a number of terminals. Each signal instance (or multipath) in a received signal is typically associated with a particular magnitude, phase, and arrival time (i.e., a time delay or time offset relative to CDMA system time). If the difference between the arrival times of the multipaths is more than one PN chip at the base station, then each received signal, $y_l(t)$, at the input to a respective receiver 252 may be expressed as:

$$y_l(t) = \sum_j \sum_i p_{i,j,l}(t) x_j(t - \hat{t}_{i,j,l}) + n(t), \quad \text{Eq (2)}$$

where $x_j(t)$ is the j-th reverse link modulated signal transmitted by the j-th terminal;

$\hat{t}_{i,j,l}$ is the arrival time, at the l-th antenna, of the i-th multipath relative to the time the j-th reverse link modulated signal, $x_j(t)$, is transmitted;

$p_{i,j,l}(t)$ represents the channel gain and phase for the i-th multipath for the j-th terminal at the l-th antenna, and is a function of the fading process;

$$\sum_{j}$$

is the summation for all reverse link modulated signals in the l-th received signal;

$$\sum_{i}$$

is the summation for all multipaths of each reverse link modulated signal in the l-th received signal; and n(t) represents the real-valued channel noise at RF plus internal receiver noise.

Each receiver 252 amplifies and frequency downconverts a respective received signal, $y_l(t)$, and further filters the signal with a receive filter that is typically matched to the transmit filter (e.g., filter 352) used at the terminal to provide a conditioned signal. Each receiver unit 252 then digitizes the conditioned signal to provide a respective stream of data samples, which is then provided to a respective sample buffer 408.

Each sample buffer 408 stores the received data samples and further provides the proper data samples to the appropriate processing units (e.g., finger processors 410 and/or searcher 412) at the appropriate time. In one design, each buffer 408 provides the data samples to a respective set of finger processors assigned to process the multipaths in the received signal associated with the buffer. In another design, a number of buffers 408 provide data samples (e.g., in a time division multiplexed manner) to a particular finger processor that has the capability to process a number of multipaths in a time division multiplexed manner. Sample buffers 408a through 408l may also be implemented as a single buffer of the appropriate size and speed.

Searcher 412 is used to search for strong multipaths in the received signals and to provide an indication of the strength and timing of each found multipath that meets a set of criteria. The search for multipaths of a particular terminal is typically performed by correlating the data samples for each received signal with the terminal's spreading sequence, locally generated at various chip or sub-chip offsets (or phases). Due to the pseudo-random nature of the spreading sequence, the correlation of the data samples with the spreading sequence should be low, except when the phase of the locally-generated spreading sequence is time-aligned with that of a multipath, in which case the correlation results in a high value.

For each reverse link modulated signal, $x_j(t)$, searcher 412 may provide a set of one or more time offsets, $t_{i,j,l}$, for a set of one or more multipaths found for that reverse link modulated signal (possibly along with the signal strength of each found multipath). The time offsets, $t_{i,j,l}$, provided by searcher 412 are relative to the base station timing or CDMA system time, and are related to the time offsets, $\tilde{t}_{i,j,l}$, shown in equation (2) which are relative to the time of signal transmission.

Searcher 412 may be designed with one or multiple searcher units, each of which may be designed to search for multipaths over a respective search window. Each search window includes a range of spreading sequence phases to be searched. The searcher units may be operated in parallel to speed up the search operation. Additionally or alternatively, searcher 412 may be operated at a high clock rate to speed up the search operation. Searcher and searching are described in further detail in U.S. Pat. Nos. 5,805,648, 5,781,543, 5,764, 687, and 5,644,591.

Each finger processor 410 may then be assigned to process a respective set of one or more multipaths of interest (e.g., multipaths of sufficient strength, as determined by controller 260 based on the signal strength information provided by searcher 412). Each finger processor 410 then receives, for each assigned multipath, the following: (1) the data samples for the received signal that includes the assigned multipath, (2) either the time offset, $t_{i,j,l}$, of the assigned multipath or a spreading sequence, $S_{i,j,l}$, with a phase corresponding to the time offset, $t_{i,j,l}$ (which may be generated by a spreading sequence generator 414), and (3) the channelization code (e.g., the Walsh code) for the code channel to be recovered. Each finger processor 410 then processes the received data samples and provides demodulated data for each assigned multipath. The processing by finger processor 410 is described in further detail below.

Symbol combiner 420 receives and combines the demodulated data (i.e., the demodulated symbols) for each terminal. In particular, symbol combiner 420 receives the demodulated symbols for all assigned multipaths for each terminal and, depending on the design of the finger processors, may time-align (or deskew) the symbols to account for differences in the time offsets for the assigned multipaths. Symbol combiner 420 then combines the time-aligned demodulated symbols for each terminal to provide recovered symbols for the terminal. Multiple symbol combiners may be provided to concurrently combine symbols for multiple terminals. The recovered symbols for each terminal are then provided to RX data processor 256 and decoded.

The processing of the multipaths may be performed based on various demodulator designs. In a first demodulator design, one finger processor is assigned to process a number of multipaths in a received signal. For this design, the data samples from the sample buffer may be processed in "segments" covering a particular time duration (i.e., a particular number of PN chips) and starting at some defined time boundaries. In a second demodulator design, multiple finger processors are assigned to process multiple multipaths in the received signal. Various aspects and embodiments are described for the first demodulator design.

The pilot interference cancellation may also be performed based on various schemes. In a first pilot interference cancellation scheme that is based on the first demodulator design, the channel response of a particular multipath is estimated based on a segment of data samples, and the estimated channel response is then used to derive an estimate of the pilot interference due to this multipath for the same segment. This scheme may provide improved pilot interference cancellation. However, this scheme also introduces additional processing delays in the data demodulation for the multipath since the segment of data samples is first processed to estimate and cancel the pilot interference before the data demodulation can proceed on the same segment.

In a second pilot interference cancellation scheme that is also based on the first demodulator design, the channel response of a particular multipath is estimated based on a segment of data samples, and the estimated channel response is then used to derive an estimate of the pilot interference due to this multipath for the next segment. This scheme may be used to reduce (or possibly eliminate) the additional processing delays in the data demodulation resulting from the pilot interference estimation and cancellation. However, since the link conditions may continually change over time, the time delay between the current and next segments should be kept sufficiently short such that the channel response estimate for the current segment is still accurate in the next segment. For clarity, the pilot interference estimation and cancellation are described below for the second scheme.

Figure 5:
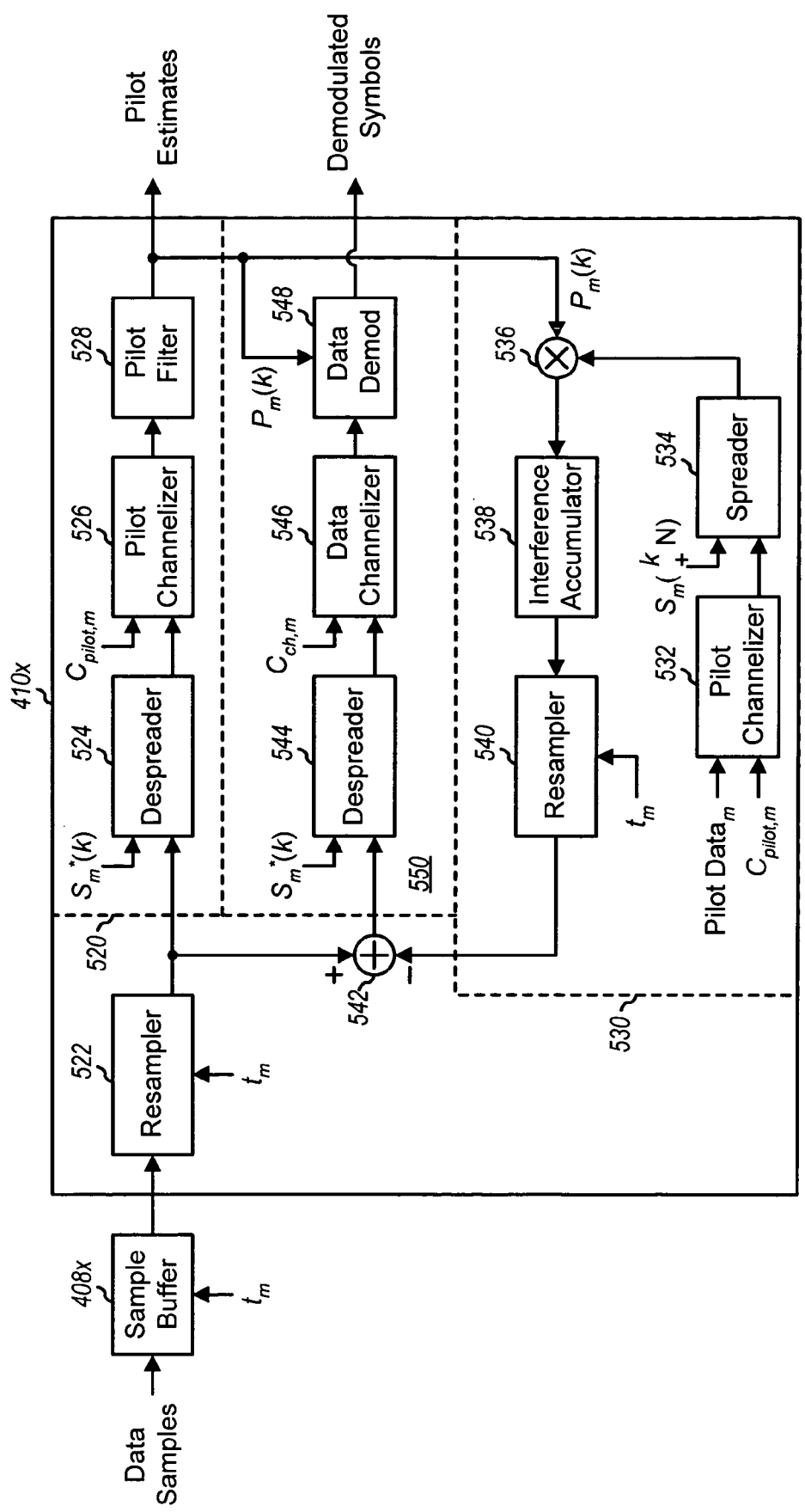
FIG. 5 is a block diagram of a specific embodiment of a finger processor within the rake receiver, which is capable of estimating and canceling pilot interference in addition to performing data demodulation.

FIG. 5 is a block diagram of a specific embodiment of a finger processor 410x, which is capable of estimating and canceling pilot interference in addition to performing the data demodulation. Finger processor 410x may be used for each finger processor 410 in rake receiver 254a shown in FIG. 4. In the following description, FIG. 5 shows the processing elements and FIGS. 6A and 6B graphically show the timing for the pilot interference estimation and cancellation.

Finger processor 410x is assigned to demodulate one or more "desired" multipaths in a particular received signal. Sample buffer 408x stores data samples for the received signal that includes the multipaths assigned to finger processor 410x. Buffer 408x then provides the appropriate data samples (in segments) to the finger processor when and as they are needed. In the embodiment shown in FIG. 5, finger processor 410x includes a resampler 522, a pilot estimator 520 (or channel estimator), a summer 542, a data demodulation unit 550, and a pilot interference estimator 530.

For each desired multipath to be demodulated by finger processor 410x, the data in all other multipaths and the pilots in all multipaths in the same received signal act as interference to this multipath. Since the pilot is generated based on a known data pattern (e.g., typically a sequence of all zeros) and processed in a known manner, the pilots in the "interfering" multipaths may be estimated and removed from the desired multipath to improve the signal quality of the data component in the desired multipath. Finger processor 410x is capable of estimating and canceling the pilot interference due to a number of multipaths found in the received signal, including the pilot of the desired multipath, as described below.

In an embodiment, the pilot interference estimation and cancellation and the data demodulation are performed in "bursts." For each burst (i.e., each processing cycle), a segment of data samples for a particular number of PN chips are processed to estimate the pilot interference due to a particular multipath. In a specific embodiment, each segment comprises data samples for one symbol period, which may be 64 PN chips for cdma2000. However, other segment sizes may also be used (e.g., for data symbols of other durations), and this is within the scope of the disclosure. As described below, the data demodulation may be performed in parallel and in a pipelined manner with the pilot interference estimation to increase processing throughput and possibly reduce the overall processing time.

To derive an estimate of the pilot interference due to the m-th multipath (where m=(i, j, l) and is the notation for the i-th multipath for the j-th reverse link modulated signal found in the l-th received signal), a segment of data samples is initially provided from buffer 408x to a resampler 522 within finger processor 410x. Resampler 522 may then perform decimation, interpolation, or a combination thereof, to provide decimated data samples at the chip rate and with the proper "fine-grain" timing phase.

Figure 6A:
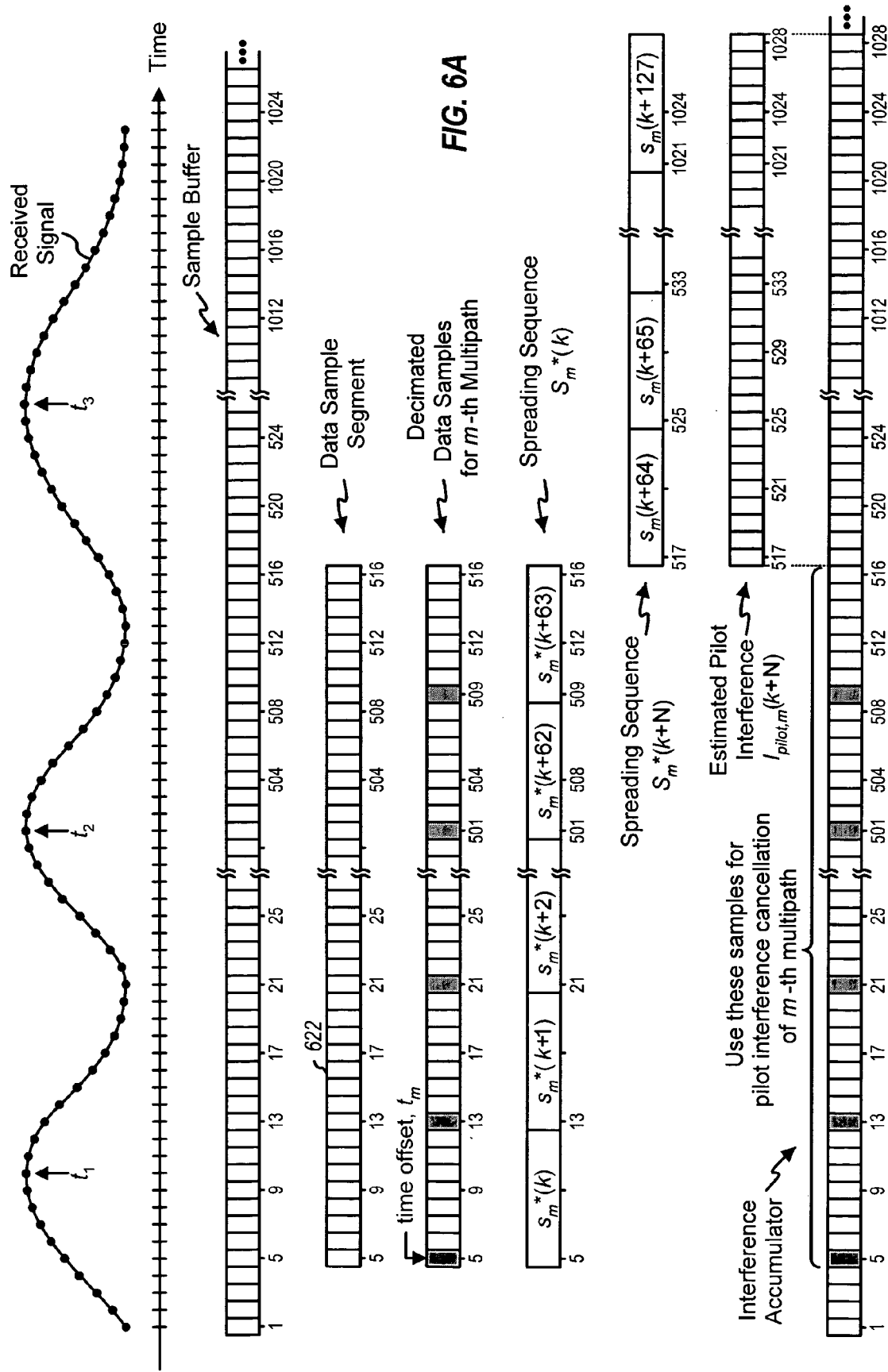
FIGS. 6A and 6B are diagrams that graphically illustrate the processing of the data samples to derive estimates of pilot interference, in accordance with one embodiment.

FIG. 6A graphically illustrates an embodiment of the resampling performed by resampler 522. The received signal is typically oversampled at a sample rate that is a multiple (e.g., 2, 4, or 8) times the chip rate to provide higher time resolution. The data samples are stored to sample buffer 408x, which thereafter provides a segment of (e.g., 512) data samples for each processing cycle. Resampler 522 then "resamples" the data samples received from buffer 408x to provide samples at the chip rate and with the proper timing phase.

As shown in FIG. 6A, if the received signal is sufficiently oversampled (e.g., at 8 times the chip rate), then the resampling for the m-multipath may be performed by providing every, e.g., 8-th data sample received from the buffer, with the selected data samples being the ones most closely aligned to the timing of the peak of the m-th multipath. The m-th multipath is typically a multipath assigned for data demodulation, and the multipath's time offset, $t_m$, may be determined and provided by searcher 412. However, pilot interference due to multipaths that are not assigned for data demodulation may also be estimated and canceled, so long as the time offset of each such multipath is known. Each multipath's time offset, $t_m$, may be viewed as comprising an integer number of symbol periods and a fractional portion of a symbol period (i.e., $t_m = t_{full,m} + t_{frac,m}$) relative to the base station timing or CDMA system time, where a symbol period is determined by the length of the channelization code (e.g., 64 PN chips for cdma2000). The fractional part of the time offset, $t_{frac,m}$, may be used to select the particular segment of data samples to provide to resampler 522 and for decimation. In the example shown in FIG. 6A, the fractional part of the time offset for the m-th multipath is $t_{frac,m}=5$, data sample segment 622 is provided by buffer 408x, and the decimated data samples provided by resampler 522 are represented by the shaded boxes.

For some other receiver design in which the received signal is not sufficiently oversampled, then interpolation may alternatively or additionally be performed along with decimation to derive new samples at the proper timing phase, as is known in the art.

Within pilot estimator 520, a despreader 524 receives the decimated data samples and a (complex-conjugate) spreading sequence, $S_m^*(k)$, having a phase corresponding to the time offset, $t_m$, of the m-th multipath whose pilot interference is to be estimated. The spreading sequence, $S_m^*(k)$, may be provided by spreading sequence generator 414. For the reverse link in cdma2000, the spreading sequence, $S_m^*(k)$, may be generated as shown for spreading sequence generator 320 in FIG. 3. And as shown in FIG. 6A, a segment of the spreading sequence, $S_m^*(k)$, of the same length and with the same timing phase as the data sample segment is used for the despreading (i.e., the spreading sequence, $S_m^*(k)$ is time-aligned with the decimated data samples).

Despreader 524 (which may be implemented as a complex multiplier such as multiplier 340 shown in FIG. 3) despreads the decimated data samples with the spreading sequence, $S_m^*(k)$, and provides despread samples. A pilot channelizer 526 then multiplies the despread samples with the channelization code, $C_{pilot,\,m}$, used for the pilot at the terminal (e.g., a Walsh code of zero for cdma2000). The decovered pilot samples are then accumulated over a particular accumulation time interval to provide pilot symbols. The accumulation time interval is typically an integer multiple of the pilot channelization code length. If the pilot data is covered with a channelization code of zero (as in cdma2000), then the multiplication with the channelization code, $C_{pilot,\,m}$, may be omitted and pilot channelizer 526 simply performs the accumulation of the despread samples from despreader 524. In a specific embodiment, one pilot symbol is provided for each segment, which has a size of one symbol period.

The pilot symbols from pilot channelizer 526 are then provided to a pilot filter 528 and filtered based on a particular lowpass filter response to remove noise. Pilot filter 528 may be implemented as a finite impulse response filter (FIR), an infinite impulse response (IIR) filter, or some other filter structure. Pilot filter 528 provides pilot estimates, $P_m(k)$, which are indicative of the channel response (i.e., the gain and phase, $a_m \cdot e^{j\theta_m}$) of the m-th multipath. Each pilot estimate, $P_m(k)$, is thus a complex value. The pilot estimates are provided at sufficient rate such that non-insignificant changes in the channel response of the multipath are captured and reported. In a specific embodiment, one pilot estimate is provided for each segment, which has a size of one symbol.

Pilot interference estimator 530 then estimates the pilot interference due to the m-th multipath for the next segment. To estimate the pilot interference, the pilot data and the pilot channelization code, $C_{pilot, m}$, for the m-th multipath are provided to a pilot channelizer 532, which channelizes the pilot data with the pilot channelization code to provide channelized pilot data. A spreader 534 then receives and spreads the channelized pilot data with a spreading sequence, $S_m(k+N)$, to generate spread pilot data (i.e., processed pilot data). The spreading sequence, $S_m(k+N)$, has a phase corresponding to the time offset, $t_m$, of the m-th interfering multipath and is further advanced by N PN chips for the next segment, as shown in FIG. 6A. If the pilot data is a sequence of all zeros and the pilot channelization code is also a sequence of all zeros (as in cdma2000), then pilot channelizer 532 and spreader 534 may be omitted and the spread pilot data is simply the spreading sequence, $S_m(k+N)$.

A multiplier 536 then receives and multiplies the spread pilot data with the pilot estimates, $P_m(k)$, from pilot filter 528 to provide an estimate of the pilot interference, $I_{pilot, m}(k+N)$, due to the m-th multipath for the next segment. Since the pilot estimates, $P_m(k)$, are derived from the current segment and used to derive the estimated pilot interference for the next segment, prediction techniques may be used to derive pilot predictions for the next segment based on the pilot estimates. These pilot predictions may then be used to derive the estimated pilot interference for the next segment.

In an embodiment, multiplier 536 provides the estimated pilot interference due to the m-th multipath at the sample rate (e.g., 8× the chip rate) and with the timing phase of the m-th multipath. This allows the estimated pilot interferences for all multipaths (which have different time offsets that are typically not all aligned to the PN chip timing boundaries) to be accumulated at a higher time resolution. The estimated pilot interference, $I_{pilot, m}(k+N)$, for the m-th multipath, which includes the same number of interference samples as for the data sample segment, is then provided to an interference accumulator 538. As shown in FIG. 6A, the interference samples for the m-th multipath are stored (or accumulated with the interference samples already stored) at locations in the accumulator determined by the fractional part of the multipath's time offset.

To derive the total pilot interference for all multipaths in a given received signal, the processing described above may be iterated a number of times, one iteration or processing cycle for each interfering multipath for which the pilot interference is to be estimated and canceled from a desired multipath. The pilot interference cancellation is typically performed for the multipaths received via the same antenna, not cross antennas, because the channel estimate from one antenna is typically not good for another antenna. If the same finger processor hardware is used for multiple iterations, then the processing may be performed in bursts, with each burst being performed on a respective segment of data samples determined by the multipath's fractional time offset.

Prior to the first iteration, accumulator 538 is cleared or reset. For each iteration, the estimated pilot interference, $I_{pilot, m}$, due to the current multipath is accumulated with the accumulated pilot interference for all prior-processed multipaths. However, as shown in FIG. 6A, the estimated pilot interference, $I_{pilot, m}$, is accumulated with samples in a specific section of accumulator 538, which is determined by the current multipath's time offset. After all interfering multipaths have been processed, the accumulated pilot interference in accumulator 538 comprises the total pilot interference, $I_{pilot}$, due to all processed multipaths.

FIG. 6A also shows an embodiment of accumulator 538. While finger processor 410x performs data demodulation for the m-th multipath for the current segment (using the total pilot interference, $I_{pilot}(k)$, derived earlier and stored in one section of accumulator 538), the pilot interference due to the m-th multipath, $I_{pilot, m}(k+N)$, for the next segment may be estimated and accumulated in another section of the accumulator.

The pilot for the m-th multipath is interference to all multipaths in the received signal, including the m-th multipath itself. For a demodulator design in which the multiple finger processors are assigned to process a number of multipaths in a received signal for a given terminal, the estimated pilot interference, $I_{pilot, m}$, due to the m-th multipath may be provided by one finger processor to other finger processors assigned to process other multipaths in the same received signal.

For the demodulation to recover the data on the m-th multipath, the data samples for a segment are provided from buffer 408x to resampler 522. Resampler 522 then resamples the received data samples to provide decimated data samples at the chip rate and with the proper timing phase for this multipath. The decimated data samples are processed as described above to provide the pilot estimates, $P_m(k)$.

Correspondingly, interference samples for the total pilot interference, $I_{pilot}(k)$, for the same segment are provided from accumulator 538 to a resampler 540. Resampler 540 similarly resamples the received interference samples to provide decimated interference samples at the chip rate and with the proper timing phase for the m-th multipath. Summer 542 then receives and subtracts the decimated interference samples from the decimated data samples to provide pilot-canceled data samples.

Within data demodulation unit 550, a despreader 544 receives and despreads the pilot-canceled data samples with a (complex-conjugate) spreading sequence, $S_m^*(k)$, to provide despread samples. The spreading sequence, $S_m^*(k)$, has a phase corresponding to the time offset, $t_m$, of the m-th multipath. A data channelizer 546 then multiplies the despread samples with the channelization code, $C_{ch,m}$, used for the code channel being recovered by the finger processor. The channelized data samples are then accumulated over the length of the channelization code, $C_{ch,m}$, to provide data symbols.

A data demodulator 548 then receives and demodulates the data symbols with the pilot estimates, $P_m(k)$, to provide demodulated symbols (i.e., demodulated data) for the m-th multipath, which are then provided to symbol combiner 420. The data demodulation and symbol combining may be achieved as described in the aforementioned U.S. Pat. No. 5,764,687 patent. The '687 patent describes BPSK data demodulation for IS-95 by performing dot product between the despread data and the filtered pilot. The demodulation of QPSK modulation, which is used in cdma2000 and W-CDMA, is an extension of the techniques described in the '687 patent. That is, instead of dot product, both dot product and cross-product are used to recover the in-phase and quadrature streams.

As noted above, the data demodulation for the m-th multipath may be performed in parallel and in a pipelined manner with the pilot interference estimation. While despreader 544 and data channelizer 546 are processing the pilot-canceled data samples for the current segment (with the spreading sequence, $S_m^*(k)$, and the channelization code, $C_{ch,m}$, to provide the data symbols for the m-th multipath, despreader 524 and pilot channelizer 526 may process the same data samples for the current segment (with the spreading sequence, $S_m^*(k)$, and the pilot channelization code, $C_{pilot,m}$) to provide the pilot symbols for this multipath. The pilot symbols are filtered by pilot filter 528 to provide pilot estimates, $P_m(k)$, for the multipath. Pilot interference estimator 530 then derives the estimated pilot interference, $I_{pilot,m}(k+N)$, due to this multipath for the following segment, as described above. In this manner, while data demodulation is performed on the current segment using the total pilot interference, $I_{pilot}(k)$, derived from a prior segment, pilot interference for the next segment is estimated and stored to another section of the accumulator, to be used for the next segment.

In an embodiment, the pilot for a particular multipath being demodulated is estimated based on the "raw" received data samples (from sample buffer 408x) as described above, and not based on the pilot-canceled data samples (from accumulator 538). In another embodiment, the pilot may be estimated based on the pilot-canceled data samples if the total pilot interference includes some or all of the interfering pilots except for the pilot of the multipath being demodulated (i.e., the pilot of the multipath being demodulated is included in the other-pilots-canceled data samples). This alternative embodiment may provide an improved estimate of the channel response of the multipath being demodulated, and is especially advantageous for the reverse link where the pilot estimation is typically the limiting factor in dealing with a weak multipath. The same "other pilots canceled" data samples that is used for pilot estimation may also be processed to recover the data for the multipath, which is advantageous for a finger processor architecture that performs both pilot estimation and data demodulation in parallel on the same data sample stream. The same concept may be used to estimate the channel response of a particular interfering multipath (i.e., the estimated channel response may be based on either the raw data samples or the "other pilots canceled" data samples having interfering pilots except for the pilot of that particular multipath removed).

Figure 6B:
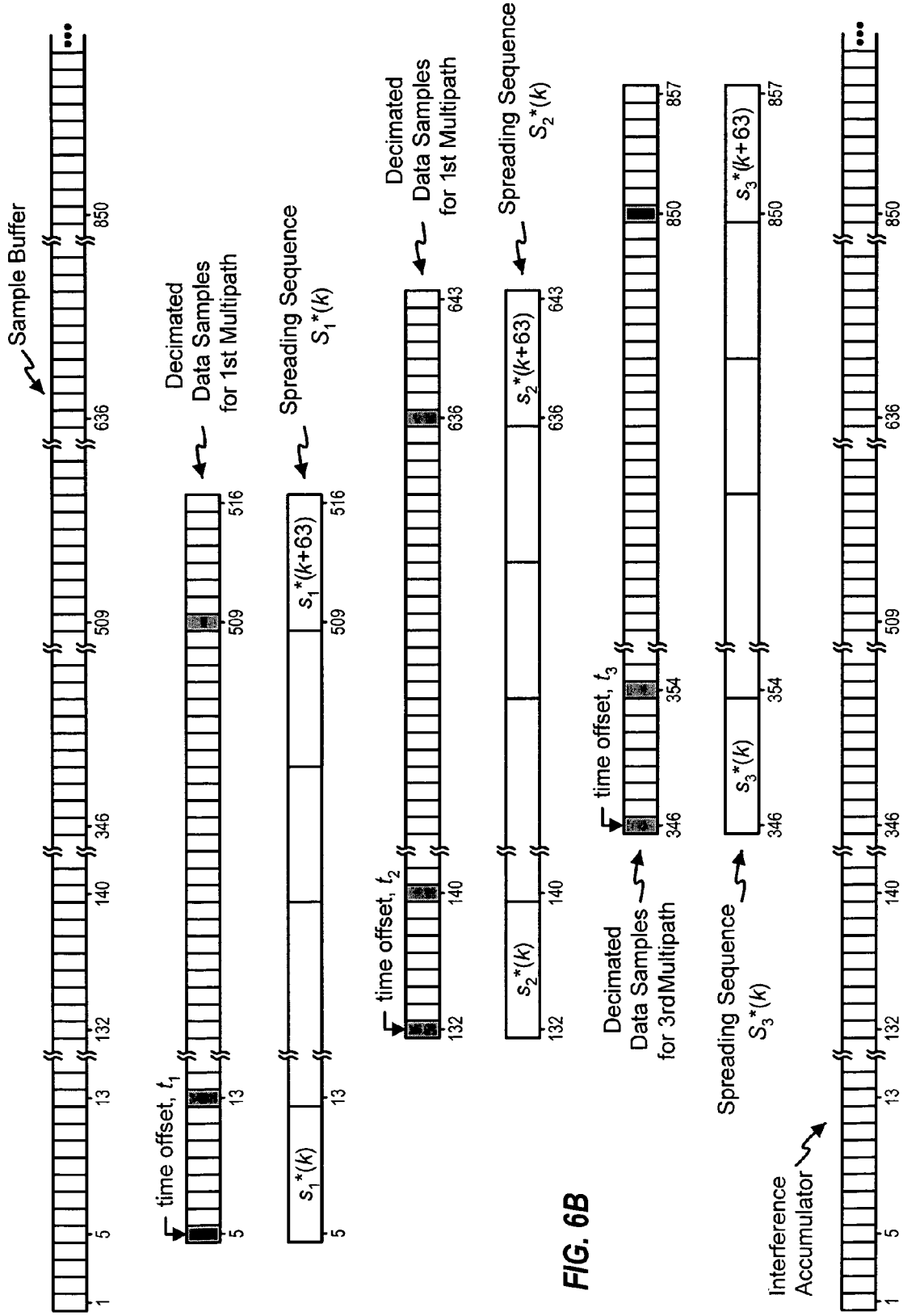

FIGS. 6A and 6B are diagrams that illustrate the processing of the data samples to derive estimates of pilot interference, in accordance with one embodiment. In the example shown in FIGS. 6A and 6B, the received signal includes three multipaths that are associated with time offsets of $t_1$, $t_2$, and $t_3$. The received signal is digitized at a sample rate that is 8 times the chip rate to provide data samples, which are stored to the sample buffer. These multipaths may or may not be sampled at their peaks.

In the example shown in FIGS. 6A and 6B, each segment included 512 data samples for a symbol period of 64 PN chips. The pilot interference is estimated for each of the three multipaths and for each symbol period. The symbol timing for each multipath is determined by the multipath's fractional time offset. If the fractional time offsets of the multipaths are not the same, which is generally true, then the symbol timing for these multipaths will be different and will be associated with different data sample segments. In an embodiment, the multipaths are processed in an order based on their fractional time offsets, with the multipath having the smallest fractional time offset being processed first and the multipath having the largest fractional time offset being processed last. This processing order ensures that the total pilot interference is derived and available for each multipath when it is processed.

In FIG. 6A, for the n-th symbol period for the m-th multipath with a fractional time offset of $t_{frac,m}=5$, resampler 522 receives data samples 5 through 516 from the sample buffer 408 and provides to despreader 524 data samples 5, 13, 21, and so on, and 509, which are represented by the shaded boxes. Correspondingly, despreader 524 receives the spreading sequence, $S_m^*(k)$, with a phase corresponding to the same time offset of $t_m$, and despreads the decimated data samples with the spreading sequence. A pilot estimate, $P_m(k)$, is then derived based on the despread samples for this segment, as described above.

To derive the estimated pilot interference due to the m-th multipath, spreader 534 receives the spreading sequence, $S_m(k+N)$, corresponding to the next segment and spreads channelized pilot data. Multiplier 536 then multiplies spread pilot data (spread by the spreading sequence, $S_m(k+N)$), with the pilot estimate, $P_m(k)$, derived from the current segment to provide the estimated pilot interference, $I_{pilot,m}(k+N)$, for the next segment. The estimated pilot interference, $I_{pilot,m}(k+N)$, comprises interference samples 517 through 1028, which are accumulated with the samples at the same indices 517 through 1028 in the interference accumulator 538, as shown in FIG. 6A. In this way, the fractional time offset of the m-th multipath is accounted for in the derivation of the total pilot interference.

For the data demodulation of the m-th multipath for the n-th symbol period, the same segment of interference samples 5 through 516 are provided from accumulator 538 to resampler 540. Resampler 540 then provides to summer 542 interference samples 5, 13, 20, and so on, and 509 (which are also shown by the shaded boxes), corresponding to the same-indexed data samples provided by resampler 522. The data demodulation of the pilot-canceled data samples is then performed as described above. Each multipath may be processed in similar manner. However, since each multipath may be associated with a different time offset, different decimated data and interference samples may be operated on.

FIG. 6B shows the three data sample segments, the decimated data samples, and the three spreading sequences used to derive the estimated pilot interferences due to the three multipaths.

In another demodulator design, the pilot interference estimation/cancellation and the data demodulation may be performed in real-time (e.g., as data samples are received), if sufficient processing capabilities are provided. For example, M finger processors may be assigned to concurrently process M multipaths in a received signal. For each symbol period, each finger processor can derive a pilot estimate for that symbol period, which is then used to derive the estimated pilot interference due to that finger processor's assigned multipath for the next symbol period. A summer then sums the estimated pilot interferences from all M finger processors (taken into account their respective time offsets), and the total pilot interference for the next symbol period is stored in the interference accumulator.

The total pilot interference may then be subtracted from the data samples as they are received for the next symbol period, and the same pilot-canceled data samples may be provided to all M finger processors for data demodulation. (These finger processors are also provided with the received data samples, without the pilot cancellation, which are used to derive the pilot estimates.) In this way, the data demodulation may be performed on pilot-canceled data samples in real time, and the sample buffer may possibly be eliminated. For the scheme in which the pilot estimate is used to derive the estimated pilot interference for the same segment (and not the next segment), the data samples may be temporarily stored (e.g., for one symbol period) while the total pilot interference is derived.

For the demodulator design in which the same data samples are processed multiple times (e.g., if one finger processor is assigned to process a number of multipaths), the sample buffer may be designed and operated in a manner to ensure that the data samples are not inadvertently dropped. In an embodiment, the sample buffer is designed to receive incoming data samples while providing stored data samples to the finger processor(s). This may be achieved by implementing the sample buffer in a manner such that stored data samples may be read from one part of the buffer while new data samples are written into another part of the buffer. The sample buffer may be implemented as a double buffer or multiple buffers, a multi-port buffer, a circular buffer, or some other buffer design. The interference accumulator may be implemented in similar manner as the sample buffer (e.g., as a circular buffer).

For the above demodulator design, to avoid overwriting samples that are still being processed, the capacity of the sample buffer may be selected to be at least twice the time required to derive the total pilot interference for all M multipaths (with the relationship between time and buffer capacity being defined by the sample rate). If a different data sample segment may be used for each of the M multipaths, then the capacity of the sample buffer may be selected to be at least $(2 \cdot N \cdot N_{os})$ for each received signal assigned to the sample buffer, where N is the duration of data samples used to derive the estimated pilot interference for one multipath and $N_{os}$ is the oversampling factor for the data samples (which is defined as the ratio of the sample rate over the chip rate). For the above example in which a segment of one symbol period (e.g., N=64 PN chips) is processed for each multipath, a buffer of two symbol periods would be able to provide a segment of one symbol period of data samples for each multipath regardless of its fractional time offset. And if the oversample rate is $N_{os}$=8, then the minimum size of the buffer is $(2 \cdot N \cdot N_{os}=2 \cdot 64 \cdot 8=1024)$ data samples.

Similarly, the capacity of the interference accumulator may be selected to be at least $(3 \cdot N \cdot N_{os})$. The extra symbol period for the interference accumulator (i.e., $3 \cdot N$ instead of $2 \cdot N$) is to account for the fact that the estimated pilot interference is derived for the next segment.

As noted above, the estimated pilot interference derived from one data sample segment may be cancelled from a later data sample segment. For a mobile terminal, the communication link and, consequently, the channel response of the various multipaths are constantly changing. Therefore, it is desirable to reduce the delay between the data samples from which the pilot interference is estimated and the data samples from which that estimated pilot interference is canceled. This delay may be as great as $2 \cdot N$ chips.

By selecting a sufficiently small value for N, the channel response of each multipath may be expected to remain relatively constant over the period of $2 \cdot N$ chips. However, the value of N should be selected to be large enough to allow for an accurate estimate of the channel response of each multipath to be processed.

Figure 7:
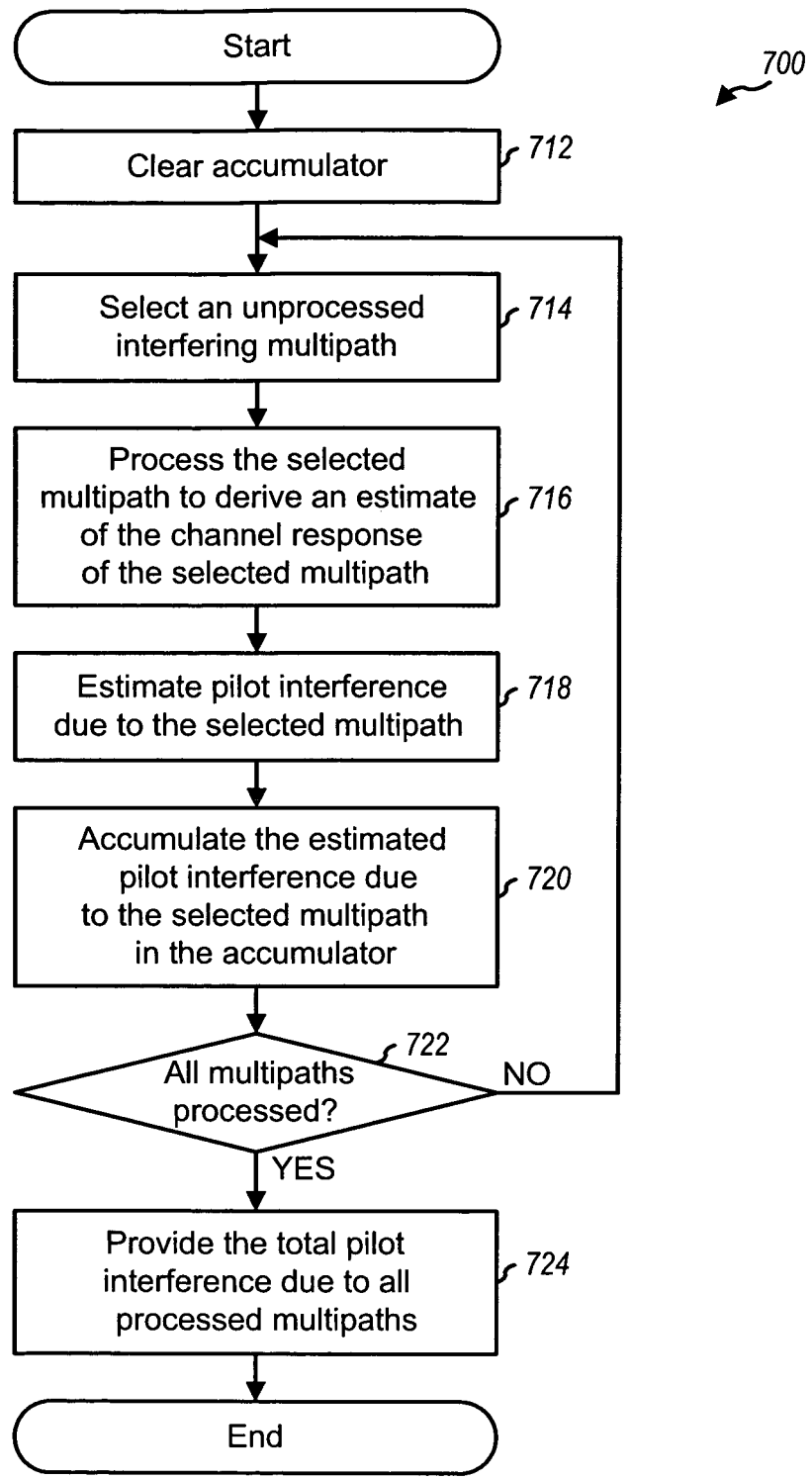
FIG. 7 is a flow diagram of an embodiment of a process to derive the total pilot interference for a number of multipaths.

FIG. 7 is a flow diagram of a process 700 to derive the total pilot interference for a number of multipaths, in accordance with one embodiment. Process 700 may be implemented by the finger processor shown in FIG. 5.

Initially, the accumulator used to accumulate the estimated pilot interferences is cleared, at step 712. An interfering multipath that has not been processed is then selected, at step 714. Typically, the pilot interference is estimated for each multipath assigned for data demodulation. However, pilot interference due to unassigned multipaths may also be estimated. In general, any number of interfering multipaths may be processed, and these multipaths are those for which the pilot interference is to be estimated and accumulated to derive the total pilot interference.

The data samples for the received signal with the selected multipath are then processed to derive an estimate of the channel response of the selected multipath, at step 716. The channel response may be estimated based on the pilot in the selected multipath, as described above. For cdma2000, this processing entails (1) despreading the data samples with a spreading sequence for the multipath (i.e., with the proper phase corresponding to the time offset of the multipath), (2) channelizing the despread data samples to provide pilot symbols (e.g., multiplying the despread samples with the pilot channelization code and accumulating the channelized data samples over the pilot channelization code length), and (3) filtering the pilot symbols to derive pilot estimates that are indicative of the channel response of the selected multipath. Estimation of the channel response using other techniques may also be implemented, and this is within the scope of the disclosure.

The pilot interference due to the selected multipath is then estimated, at step 718. The pilot interference may be estimated by generating processed pilot data and multiplying this data with the estimated channel response derived in step 716. The processed pilot data is simply the spreading sequence for the selected multipath if the pilot data is a sequence of all zeros and the pilot channelization code is also all zeros. In general, the processed pilot data is the pilot data after all signal processing at the transmitter unit but prior to the filtering and frequency upconversion (e.g., the data at the output of modulator 216a in FIG. 3 for the reverse link in cdma2000).

The estimated pilot interference for the selected multipath is then accumulated in the interference accumulator with the estimated pilot interferences for prior-processed multipaths, at step 720. As noted above, the timing phase of the multipath is observed in performing steps 716, 718, and 720.

A determination is then made whether or not all interfering multipaths have been processed, at step 722. If the answer is no, then the process returns to step 714 and another interfering multipath is selected for processing. Otherwise, the content of the accumulator represents the total pilot interference due to all processed multipath, which may be provided in step 724. The process then terminates.

The pilot interference estimation in FIG. 7 may be performed for all multipaths in a time-division multiplexed manner using one or more finger processors. Alternatively, the pilot interference estimation for multiple multipaths may be performed in parallel using a number of finger processors. In this case, if the hardware has sufficient capabilities, then the pilot interference estimation and cancellation may be performed in real-time along with the data demodulation (e.g., as the data samples are received, with minimal or no buffering, as described above).

Figure 8:
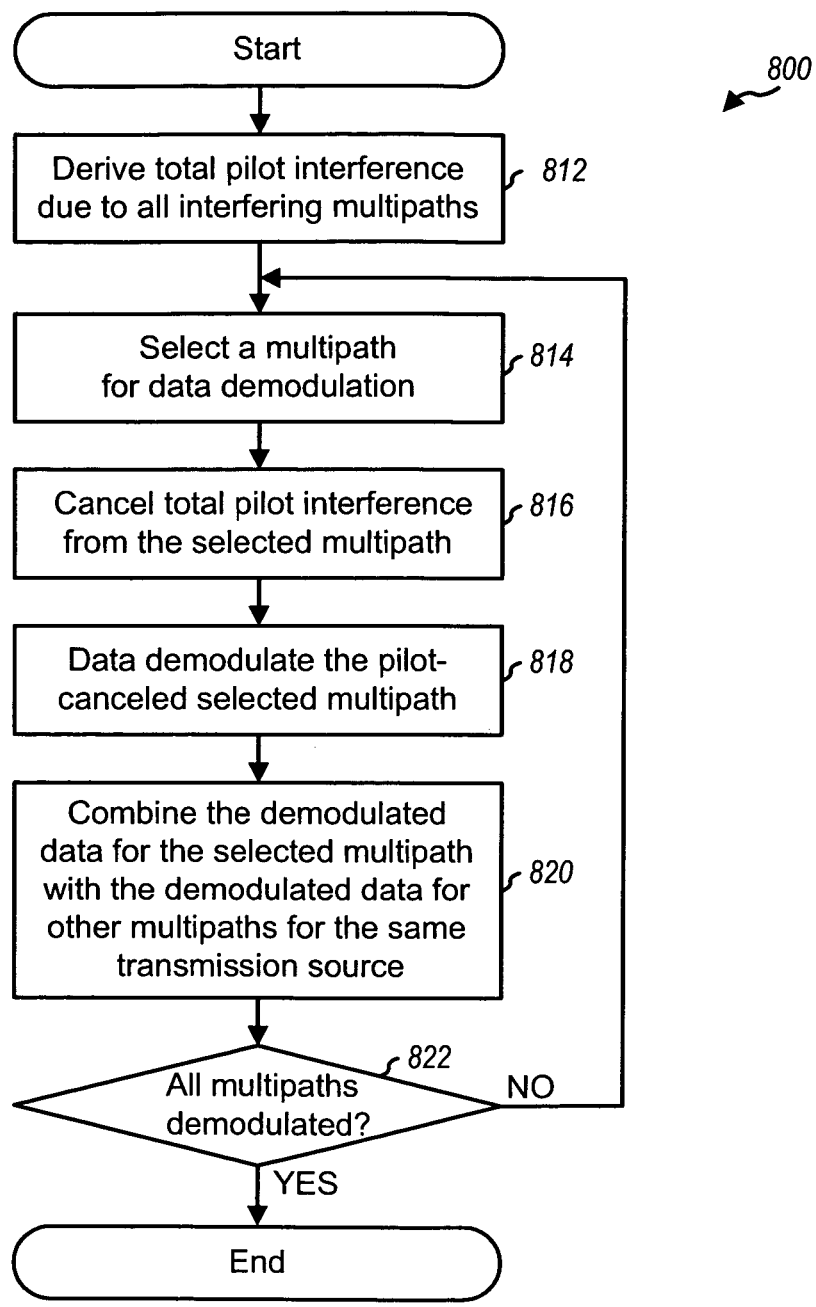
FIG. 8 is a flow diagram of an embodiment of a process to data demodulate a number of multipaths with pilot interference cancellation.

FIG. 8 is a flow diagram of a process 800 to data demodulate a number of multipaths with pilot interference cancellation, in accordance with one embodiment. Process 800 may also be implemented by the finger processor shown in FIG. 5.

Initially, the total pilot interference due to all multipaths of interest is derived, at step 812. Step 812 may be implemented using process 700 shown in FIG. 7. A particular multipath is then selected for data demodulation, at step 814. In an embodiment and as described above, the total pilot interference is initially canceled from the selected multipath, at step 816. This may be achieved by subtracting the interference samples for the total pilot interference (which are stored in the accumulator) from the data samples for the received signal that includes the selected multipath.

Data demodulation is then performed on the pilot-canceled signal in the normal manner. For cdma2000, this entails (1) despreading the pilot-canceled data samples, (2) channelizing the despread data to provide data symbols, and (3) demodulating the data symbols with the pilot estimates. The demodulated symbols (i.e., the demodulated data) for the selected multipath are then combined with the demodulated symbols for other multipaths for the same transmitter unit (e.g., terminal). The demodulated symbols for multipaths in multiple received signals (e.g., if receive diversity is employed) may also be combined. The symbol combining may be achieved by the symbol combiner shown in FIG. 4.

A determination is then made whether or not all assigned multipaths have been demodulated, at step 822. If the answer is no, then the process returns to step 814 and another multipath is selected for data demodulation. Otherwise, the process terminates.

As noted above, the data demodulation for all assigned multipaths of a given transmitter unit may be performed in a time-division multiplexed manner using one or more finger processors. Alternatively, the data demodulation for all assigned multipaths may be performed in parallel using a number of finger processors.

Referring back to FIGS. 4 and 5, searcher 412 may be designed and operated to search for new multipaths based on the pilot-canceled data samples (instead of the raw received data samples from buffers 408). This may provide improved search performance since the pilot interference from some or all known multipaths may have been removed as described above.

Another Rake Receiver and Finger Processor Embodiment

Figure 9:
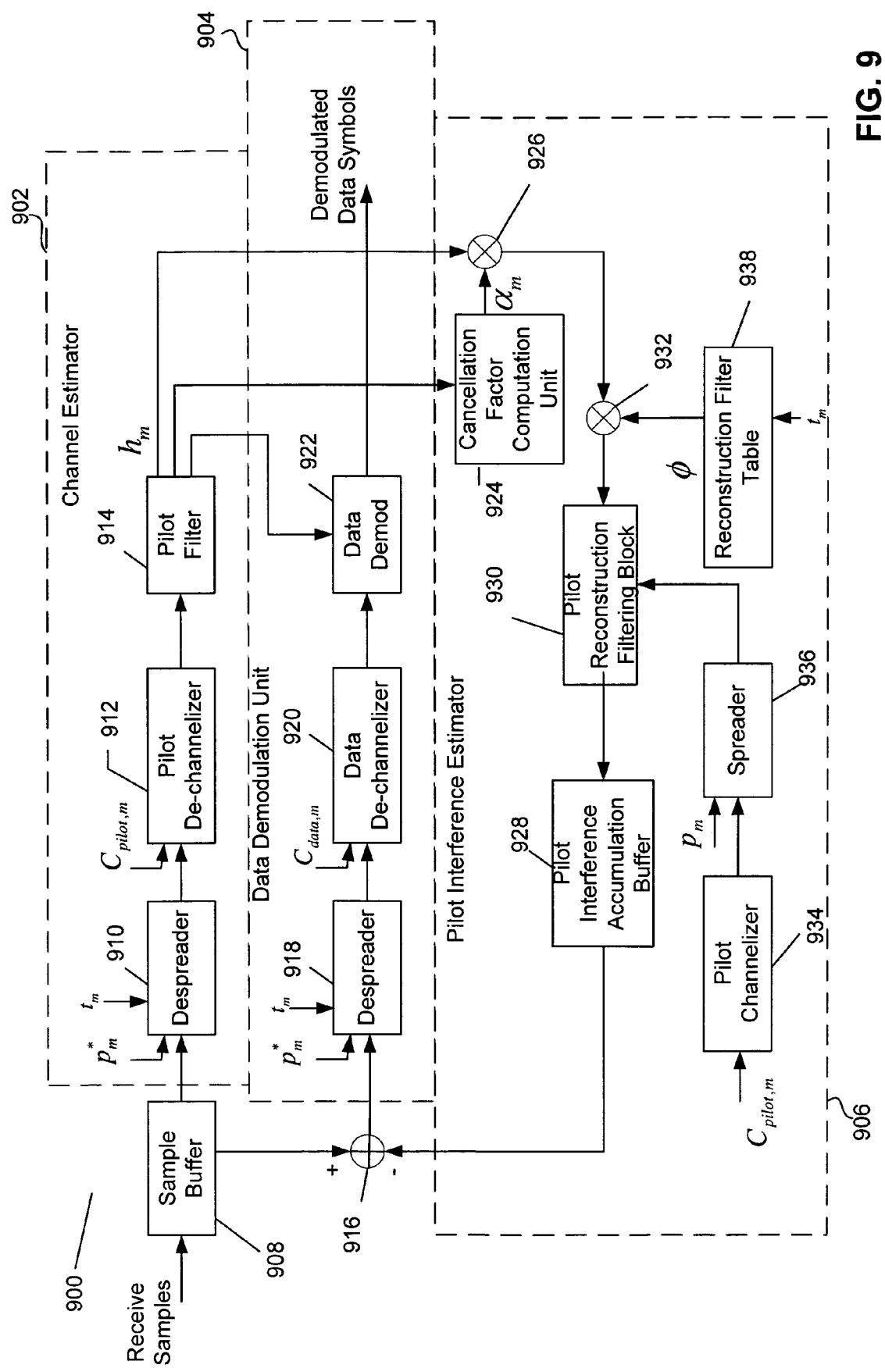
FIG. 9 is a block diagram of a sample buffer and another embodiment of a finger processor within a rake receiver, such as the rake receiver in FIG. 4.

FIG. 9 is a block diagram of a sample buffer 908 and another embodiment of a finger processor 900 within a rake receiver, which may be similar in some aspects to the rake receiver 254a of FIG. 4 described above. A rake receiver may include a large number of individual finger processors 900, such as 256 or 512 finger processors 900 to process several multipaths. Alternatively, a rake receiver may include a single high-speed processor to process several multipaths in a time division manner, which simulates functions of several finger processors 900. One embodiment of the sample buffer 908 may be a circular random access memory (RAM) storing segments of data samples at a sample rate of chip rate×2 ("chip×2"). The chip rate is equal to $1/T_C$, where $T_C$ is the chip duration. For example, the chip rate may be 1.2 MHz. Other chip rates may be used.

The finger processor 900 may be used for a CDMA2000 1xEV-DO system or other systems. The finger processor 900 includes a channel estimator 902, a data demodulation unit 904, and a pilot interference estimator 906. The channel estimator 902 includes a despreader 910, a pilot de-channelizer 912 and a pilot filter 914. The data demodulation unit 904 includes a despreader 918, a data de-channelizer 920 and a data demodulator 922. The pilot interference estimator 906 includes a cancellation factor computation unit 924, multipliers 926 and 932, a reconstruction filter table 938, a pilot reconstruction filtering block 930, a pilot interference accumulation block 928, a pilot channelizer 934 and a spreader 936.

The channel estimator 902 in FIG. 9 may operate in a similar manner as the pilot estimator 520 described above with reference to FIG. 5 with some exceptions described below. Similarly, the data demodulation unit 904 in FIG. 9 may operate in a similar manner as the data demodulation unit 550 described above with reference to FIG. 5 with some exceptions described below.

The despreaders 910, 918 receive complex conjugate spreading sequences, $p_m^*$, e.g., PN sequences described above as $S_m^*(k)$ with FIG. 5, from the spreading sequence generator 414 (FIG. 4). In one embodiment, the despreaders 910, 918 first multiply (despread) the data samples of a segment from the sample buffer 908 starting at a time offset $t_m$ of the multipath with the spreading sequence, $p_m^*$, and then resample the despread data samples. In another embodiment, the despreaders 910, 918 first resample the data samples of a segment from the sample buffer 908 starting at a time offset $t_m$ of the multipath, and then multiply the resampled data samples with the spreading sequence, $p_m^*$.

The despreaders 910, 918 in FIG. 9 may include resamplers or interpolators, which resample, upsample, sum, decimate or interpolate data samples from the sample buffer 908 to achieve a desired rate. The type of resampling depends on the rate of received signal samples stored in the sample buffer 908. For example, the despreader 910 may upsample samples from the sample buffer 908 at a rate of chip×2 to a maximum resolution of finger time offsets, e.g., chip×8. The despreader 910 may decimate chip×8 samples to chip×1 for an output to the pilot de-channelizer 912.

In general, different rates, such as chip×1, chip×2, chip×4, and chip×8, may be used by different components of the finger processor 900. Higher rates like chip×8 may improve performance and accuracy of samples. Lower rates like chip×2 may be less accurate but improve efficiency by reducing the complexity of calculations and the processing time.

The pilot de-channelizer 912 (a) receives despread data samples from the despreader 910 and a pilot channelization code $C_{pilot,m}$ and (b) outputs de-channelized pilot symbols. Similarly, the data de-channelizer 920 (a) receives despread data samples from the adder 916 and a data channelization code $C_{data,m}$ and (b) outputs de-channelized data symbols.

Pilot Filter

The pilot filter 914 derives at least two values, $h_m$ and $N_t$, which may be output from the pilot filter 914 in various forms such as $h_m/N_t$ and $|h_m|^2/N_t$. $h_m$ is the channel estimate of the specific multipath assigned to the finger processor 900. The channel estimate $h_m$ may correspond to a channel coefficient (amplitude, phase, and delay or time offset). The pilot filter 914 may use one or more segments, e.g., a current segment "n" and/or past or future segments, to provide a channel estimate $h_m$. In one example, the pilot filter 914 uses four to six segments to derive a channel estimate. Alternatively, the pilot filter 914 may use one or more segments to provide a future channel estimate, i.e., a prediction of a channel estimate. The channel estimate $h_m$ will be used by the pilot interference estimator 906 for pilot reconstruction, as described below. The channel estimate $h_m$ output by the pilot filter 914 to the multiplier 926 may be a complex value with I and Q components.

$N_t$ is the variance of noise plus an interference term seen by this finger processor 900. If the variance of the channel estimate $h_m$ is high, then the channel is noisy. $h_m/N_t$ is used by the data demodulator 922 to demodulate data. $|h_m|^2/N_t$ is used by the cancellation factor computation unit 924. The pilot filter 914 may include a phase rotator or phase corrector.

Computing a Cancellation Factor

Interference cancellation by a plurality of finger processors 900 may improve capacity of multiple access channels if the receiver has perfect channel state information. In reality, each user's channel is time-varying, and it may be a challenge to estimate reliable channel state information. Each user's pilot should be canceled from the received signal by using realistic or reliable pilot-based channel estimates. Using unreliable channel estimates may lead to over-cancellation of data samples. The cancellation factor computation unit 924 reduces or prevents cancellation if the channel estimator 902 detects an unreliable noisy pilot-based channel estimate. Thus, the cancellation factor computation unit 924 minimizes residual energy (noise) after pilot interference cancellation.

For example, three finger processors 900 may process the same received signal at different offsets and detect different SNRs or channel estimates. If one finger processor detects a particularly noisy channel, it may be desirable to reduce (scale down) the contribution of that finger processor's reconstructed pilot for pilot interference cancellation.

If $N_t$ (variance of noise plus an interference term seen by this finger processor 900) is high, and pilot signal strength $|h_m|^2$ is low, then the channel estimate $h_m$ may be unreliable. The cancellation factor computation unit 924 may select a low cancellation factor $\alpha_m$, such as 0, 0.1, 0.2, 0.5, etc. This reduces the amplitude of a noisy channel estimate used by a finger processor 900 to reconstruct pilot samples.

If $N_t$ is low, and pilot signal strength $|h_m|^2$ is high, then the channel estimate $h_m$ is probably reliable, and the cancellation factor computation unit 924 may select a high cancellation factor $\alpha_m$, such as 0.8, 0.9, 1.0, etc. If $N_t$ is high, and signal strength $|h_m|^2$ is also high, then the channel estimate $h_m$ may be somewhat reliable, and the cancellation factor computation unit 924 may select a moderate cancellation factor $\alpha_m$, such as 0.5, 0.6, 0.7, 0.8, etc. Values for the cancellation factor $\alpha_m$ may depend on how pilot demodulation is implemented and how a channel estimate is derived. In some cases, the cancellation factor $\alpha_m$ may be selected to be greater than one. For example, a channel's phase may be improperly aligned during pilot demodulation, which causes energy to be cancelled. This channel has an under-estimated signal amplitude or biased channel estimate. Thus, selecting and using a cancellation factor $\alpha_m$ greater than one will add some correction back to the channel estimate. The equation below may be optimal for a channel that is constant over one segment with Gaussian noise.

In one embodiment, the cancellation factor computation unit 924 uses $|h_m|^2/N_t$ from the pilot filter 914 to compute a cancellation factor $\alpha_m$ from an equation:

$$\alpha_m = [(|h_m|^2/N_t)N]/[1+(|h_m|^2/N_t)N]$$

where $|h_m|^2/N_t$ may be proportional to $E_{cp}/N_t$, $E_{cp}$ is the energy per chip estimated by the channel estimator 902, $N_t$ is noise ($E_{cp}/N_t$ represents the signal-to-noise ratio), and N is the averaging length of the channel estimate. N represents a number of samples used to estimate $h_m$ and $N_t$. N may be the segment length, such as 512, 1024 or 2048 chips.

In another embodiment, the cancellation factor computation unit 924 uses $|h_m|^2/N_t$ from the pilot filter 914 to select an optimal cancellation factor $\alpha_m$ from a look-up table (LUT). The look-up table includes pre-determined values or ranges of $|h_m|^2/N_t$ and corresponding pre-determined cancellation factors $\alpha_m$.

FIG. 10 is an example of a lookup table for $|h_m|^2/N_t$ and pre-determined cancellation factors $\alpha_m$. The table uses $X=(2048)(|h_m|^2/N_t)$, where X is saturated and rounded to 4 bits to provide a number between 0 and 15 in the left column. The right column contains pre-determined cancellation factors $\alpha_m$ derived from an equation:

$$\alpha_m = N[|h_m|^2/N_t]/[1+(N)|h_m|^2/N_t].$$

The size of the table may vary if other equations are used or more information than $|h_m|^2/N_t$ is used to compute the cancellation factor.

The first multiplier 926 multiplies, i.e., scales, the channel estimate $h_m$ by the computed or selected cancellation factor $\alpha_m$ from the cancellation factor computation unit 924 to provide per-segment weighted channel coefficients.

Pilot Reconstruction Filtering

Figure 14:
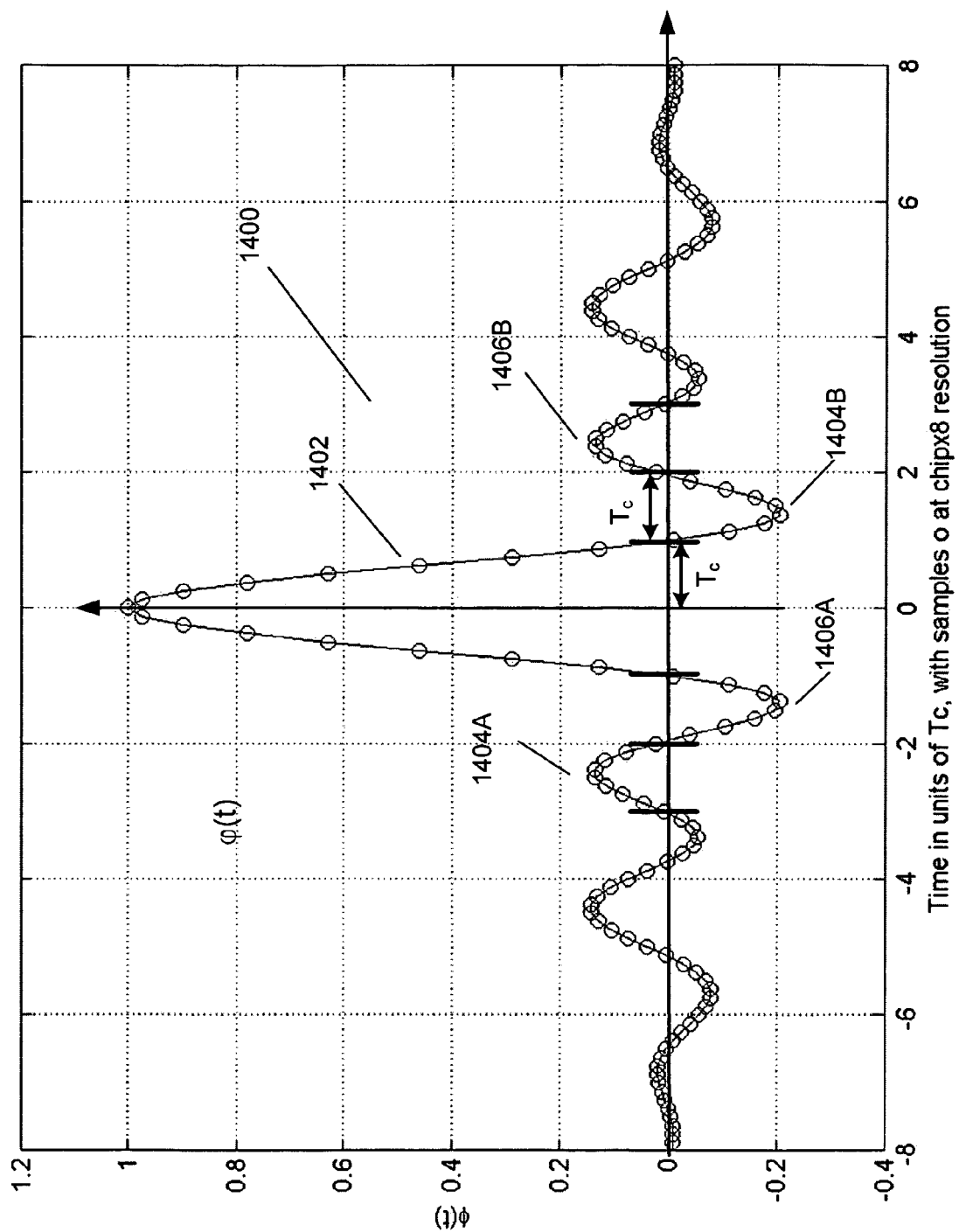
FIG. 14 illustrates an example of a convolution of a transmit pulse provided by the transmit filter of FIG. 3 and a receive filter in the receiver of FIG. 2.

If the time delay or offset $t_m$ of a multipath received signal is an integer multiple of the chip duration $T_C$ plus a fraction of chip duration $T_C$, i.e., less than one chip duration $T_C$, inter-chip interference (ICI) may occur. The finger processor 900 performs reconstruction filtering to account for pulse-shaping by the transmitter 218 (FIG. 3). FIG. 14 illustrates an example of $\phi(t)$ 1400, which is a convolution of an estimated (pre-computed) transmit pulse $\phi_{TX}(t)$ in the time domain from the transmit filters 352a, 352b of FIG. 3 and the receive filter function $\phi_{RX}(t)$ of the receiver 252 (described above). Specifically, the reconstruction filter table 938, second multiplier 932 and pilot reconstruction filtering block 930 in FIG. 9 account for multiple lobes, e.g., 1402, 1404A, 1404B, 1406A, 1406B (i.e., multiple taps), of an estimated transmit pulse, and not just the center lobe, e.g., 1402 (i.e., center tap or peak value), of the estimated transmit pulse. The filtering performed by the finger processor 900 provides more reliable reconstructed pilot samples. Without considering the shape of the transmit pulse and the receive filter and reconstruction filtering, the reconstructed pilot signal may not accurately reflect the pilot's contribution to the received samples.

In one embodiment, the pilot reconstruction filtering block 930 includes a polyphase finite impulse response filter (FIR), which combines decimating, e.g., from chip×8 to chip×2, and filtering in a single process. A polyphase filter may be given a phase, decimate a filter function according to the given phase, and then perform filtering. For example, a polyphase filter may use the convolution described above decimated by 8 with 8 different possible phases. A time offset $t_m$ input into the filter table 938 selects filter coefficients corresponding to one of 8 different possible phases. The multiplier 932 multiplies the filter coefficients (according to the selected phase) by the channel estimate and cancellation factor. The reconstruction filtering block 930 filters (performs a convolution of) a spread pilot signal from spreader 936 at chip×8 with the filter coefficients, channel estimate and cancellation factor. If the convolution has 64 samples (8 groups of 8 samples), after decimation of 8, the reconstruction filtering block 930 is an 8-tap filter and only filters 8 samples. This embodiment may reduce complexity of the pilot interference estimator 906.

The reconstruction filter table 938 stores a set of pre-computed filter coefficients that represent a convolution $\phi(t)$ of an estimated transmit pulse $\phi_{TX}(t)$ (from transmit filters 352a, 352b of FIG. 3) and the receive filter $\phi_{RX}(t)$ (e.g., a low pass filter) in the receiver 252 of FIG. 2. The transmit pulse $\phi_{TX}(t)$ used by the transmit filters 352a, 352b of the terminal 106 may be known or estimated by the finger processor 900 at the base station 104. The transmit pulse $\phi_{TX}(t)$ may be defined by a mobile phone manufacturer or by a standard, such as IS-95, CDMA2000, etc. The receive filter function $\phi_{RX}(t)$ may ideally be a matched filter (MF) with the transmit filters 352 in FIG. 3, but a real receive filter may not be matched exactly with the transmit filters 352. The receive filter function $\phi_{RX}(t)$ may be set when a base station receiver is made.

In one configuration, the convolution is sampled at the highest sample rate in the finger processor 900 (maximum resolution of finger time offsets), e.g., chip×8, such that the filter table 938 includes a plurality of filter tables, e.g., 8 filter tables, where the $i^{th}$ filter table corresponds to chip-level samples of an original chip×8 autocorrelation function $\phi$ at a time offset i, where i=0, 1, 2, . . . 7. Each filter table may have 2M+1 tap entries, and each entry may have 16 bits. In one embodiment, M is selected to be greater than or equal to two to reduce performance loss (if M=2, then 2M+1=5). The filter table may account for 5-13 chip time spans at chip×1 (where M=2 to 6, and 2M+1=5 to 13), or 33-97 chip×8 time spans (where M=2 to 6, and 2M(8)+1=33 to 97). In one embodiment, the same filter table 938 may be used by a plurality of finger processors 900.

In one embodiment, the second multiplier 932 of each finger processor 900 may access two such filter tables at a proper time offset for $t_m$ (assigned to the finger processor 900) for reconstruction of chip×2 pilot samples, one table for even samples and one table for odd samples. The second multiplier 932 multiples the scaled per-segment channel estimate $h_m$ coefficients from the first multiplier 926 with each filter tap (pre-computed filter coefficients) of the two selected filter tables. The second multiplier 932 outputs per-segment filter tap coefficients (e.g., at chip×2) to the pilot reconstruction filtering block 930.

In one embodiment, a separate resampler may not be needed in the pilot interference estimator 906 if the output of the pilot reconstruction filtering block 930 provides samples at chip×2. The reconstruction filtering block 930 may change a chip rate to a sample rate.

The pilot channelizer 934 and spreader 936 in FIG. 9 may operate in a similar manner as the pilot channelizer 532 and spreader 534 in FIG. 5, except the spreader 936 in FIG. 9 receives the spreading sequence $p_m$ of the current segment "n." In contrast, the spreader 534 in FIG. 5 receives the spreading sequence $S_m(k+N)$ for the next segment, as described above with FIGS. 5 and 6A. The spreader 936 in FIG. 9 receives the spreading sequence $p_m$ of the current segment "n" and provides a spread pilot signal (e.g., complex PN sequence chips) for the current segment "n," not the next segment "n+1." Thus, the finger processing 900 of FIG. 9 reconstructs pilot interference of the current segment "n." There may be a short delay between reconstructing and accumulating pilot interference from multiple finger processors for the current segment "n," and then subtracting the accumulated reconstructed pilot interference of the current segment "n" from the data samples of the current segment "n." But this approach (canceling the accumulated reconstructed pilot interference of the current segment "n" from the data samples of the current segment "n") may provide more reliable/accurate pilot interference cancellation, especially for highly time-variant channels.

The pilot channelizer 934 may receive complex channelization codes with I and Q components. The spreader 936 may receive complex PN sequences with four possible values of +/−1 or +/−i. The pilot channelizer 934 and spreader 936 may generate extra chips on each side of a current segment "n" to assist filtering by the pilot reconstruction filtering block 930.

The pilot reconstruction filtering block 930 performs the actual filtering, i.e., performs a convolution of a spread pilot signal (e.g., a PN sequence) from the spreader 936 and the product of the filter table coefficients $\phi(t)$, cancellation factor and channel estimate. For example, the pilot reconstruction filtering block 930 may include two 5-tap filters, 9-tap filters or 13-tap filters at chip×1. There may be 2M+1 taps for each filter. The filtering provided by the pilot reconstruction filtering block 930 may reduce the effect of ICI (inter-chip interference).

The pilot reconstruction filtering block 930 may reconstruct one segment of user-time aligned pilot signals at chip×2 resolution and provide chip×2 pilot samples. In another embodiment, the pilot reconstruction filtering block 930 filters a PN sequence oversampled at chip×8, and a resampler (between the pilot reconstruction filtering block 930 and buffer 928) decimates the chip×8 samples from the pilot reconstruction filtering block 930 to chip×2 with a given phase, i.e., starting sample, from 0 to 7 (depending on time offset $t_m$). The samples are then stored in the buffer 928.

The pilot reconstruction filtering block 930 outputs a reconstructed pilot interference signal $\hat{p}(n)$ comprising estimated pilot samples of the multipath assigned to the finger processor 900. The pilot reconstruction filtering block 930 may include a phase de-rotator or phase corrector, particularly if the despreader 910 includes a phase rotator that compensates for frequency offsets.

Pilot Interference Accumulation Buffer

The pilot interference accumulation buffer 928 stores and accumulates reconstructed pilots from the pilot reconstruction filtering block 930 at proper time offsets. As an example, the pilot interference accumulation buffer 928 may be a circular random access memory (RAM). In one configuration, there may be a single pilot interference accumulation buffer 928 to store and accumulate reconstructed pilot samples with different time offsets from a plurality of pilot reconstruction filtering blocks 930 of a plurality of finger processors 900. A single interference accumulation buffer may use less memory space and other resources compared to an embodiment with multiple interference accumulation buffers in multiple finger processors.

The pilot interference accumulation buffer 928 may have the same resolution as the sample buffer 908. For example, the pilot interference accumulation buffer 928 may be at chip×2 resolution, i.e., operating at a speed of 2×chip rate. If each segment has a length of 512 chips, then the pilot interference accumulation buffer 928 may store at least 2 segments, i.e., 512 chips/segment×2 samples/chip=1024 pilot samples, which are generated from the pilot reconstruction filtering block 930. With a length of at least 2 segments, the pilot interference accumulation buffer 928 may store overlap of previous pilot samples. The pilot interference accumulation buffer 928 may be implemented with other sizes. The pilot interference accumulation buffer 928 may use other sample rates, such as 3/2 or 4/3×the chip rate.

After the finger processors 900 finish reconstructing pilots, the interference accumulation buffer 928 contains an overall pilot interference estimate. The adder 916 in each finger processor 900 then subtracts the interference accumulation buffer content sample-wise (from the interference accumulation buffer 928) from the received signal (from the sample buffer 908) to provide pilot-free data samples to the data demodulation unit 904.

The complexity reduction of using a single interference accumulation buffer may be achieved by making the reconstructed pilot independent from the multipath (user) arrival time. For example, the reconstructed pilot may be generated at a chip×2 rate and system-time-aligned. Thus, the reconstructed pilot may be independent from the multipath (user) arrival time. The reconstructed pilot provided by the interference accumulation buffer 928 may be subtracted directly, e.g., via burst subtraction, from the received signal provided by the sample buffer 908 according to system time without considering finger or user time, i.e., without resampling. This eliminates the need for a resampler, such as the resampler 540 in the finger processor 410 of FIG. 5.

Time Snapshot

Figure 11:
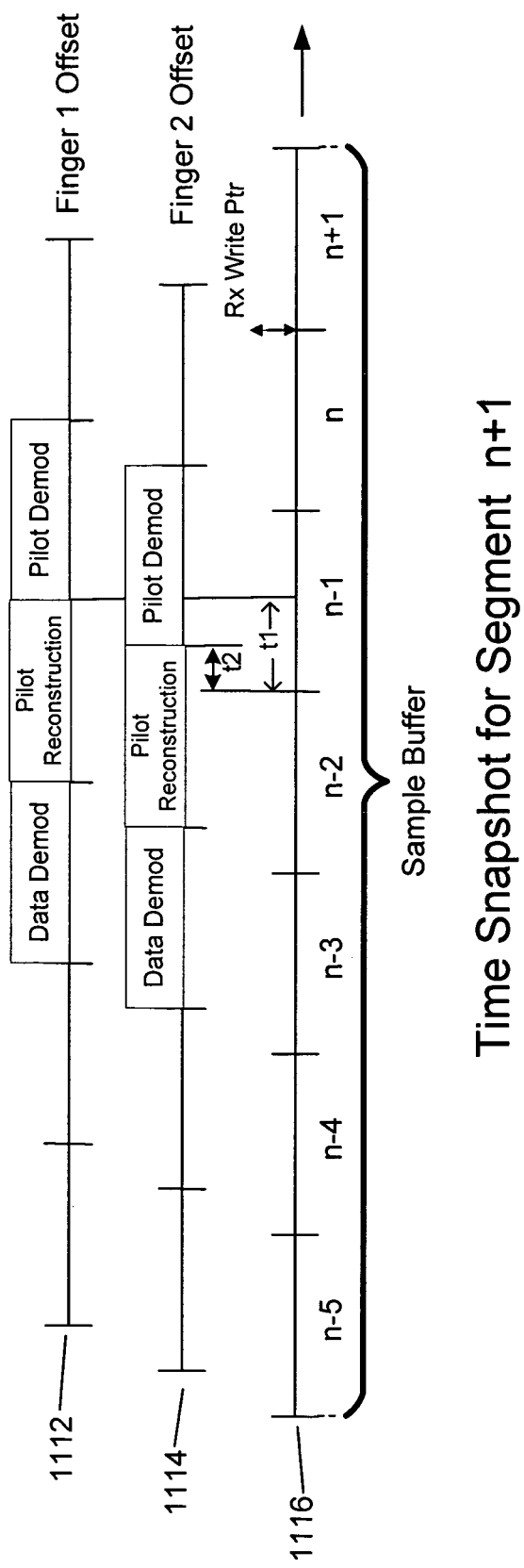
FIG. 11 shows an example of a time snapshot for two finger processors like the finger processor of FIG. 9.

FIG. 11 shows an example of a time snapshot for two finger processors 900 (FIG. 9), which have different multipath time offsets $t_1$ and $t_2$. The second finger processor has a shorter time offset than the first finger processor. As shown by lines 1112 and 1114, the two finger processors perform pilot demodulation, pilot reconstruction and data demodulation for a sequence of segments, "n−1," "n−2," and "n−3," while the receiver 252 (FIG. 4) writes a next segment "n+1" in the sample buffer 908 (FIG. 9) with a receiver (Rx) write pointer. The bottom line 1116 in FIG. 11 represents a timeline in real time of segments "n−5," "n−4," "n−3," "n−2," "n−1," "n," "n+1," etc. Segment "n" represents a current segment. Segment "n−1" represents a previous segment. Segment "n+1" represents a next segment. Each "segment" may have a time span of 512 chips, for example. Each "chip" may correspond to 100 processor clock cycles, for example.

When the receiver 252 (FIG. 4) begins to write a next segment "n+1" into the sample buffer 908, one or more previous segments, e.g., "n−1" and "n," are stored in the sample buffer 908 (by a previous write operation) and available for processing by the two finger processors. Each finger processor's time delay offset t shifts the starting data sample and ending data sample to the right for pilot demodulation of segment "n−1," as shown in FIG. 11. Thus, as segment "n+1" is written into the sample buffer 908, both first and second finger processors demodulate pilots for segment "n−1" with some data samples from segment "n−1" and some data samples from segment "n." In this embodiment, the first and second finger processors may not be able to demodulate pilots for segment "n" while segment "n+1" is written to the sample buffer 908 because both finger processors would need data samples from segment "n" and segment "n+1" (due to the finger processors' time offsets $t_1$ and $t_2$), and segment "n+1" has not been written yet in the sample buffer 908.

FIG. 11 shows a small delay for data demodulation because a pilot is reconstructed and cancelled for the current segment "n," in contrast to an estimated pilot interference for a next segment "n+1" as described above with FIG. 5. But a finger processor that uses the timeline of FIG. 11 may achieve a more accurate channel estimate and better pilot interference cancellation (PIC) gain.

Figure 12A:
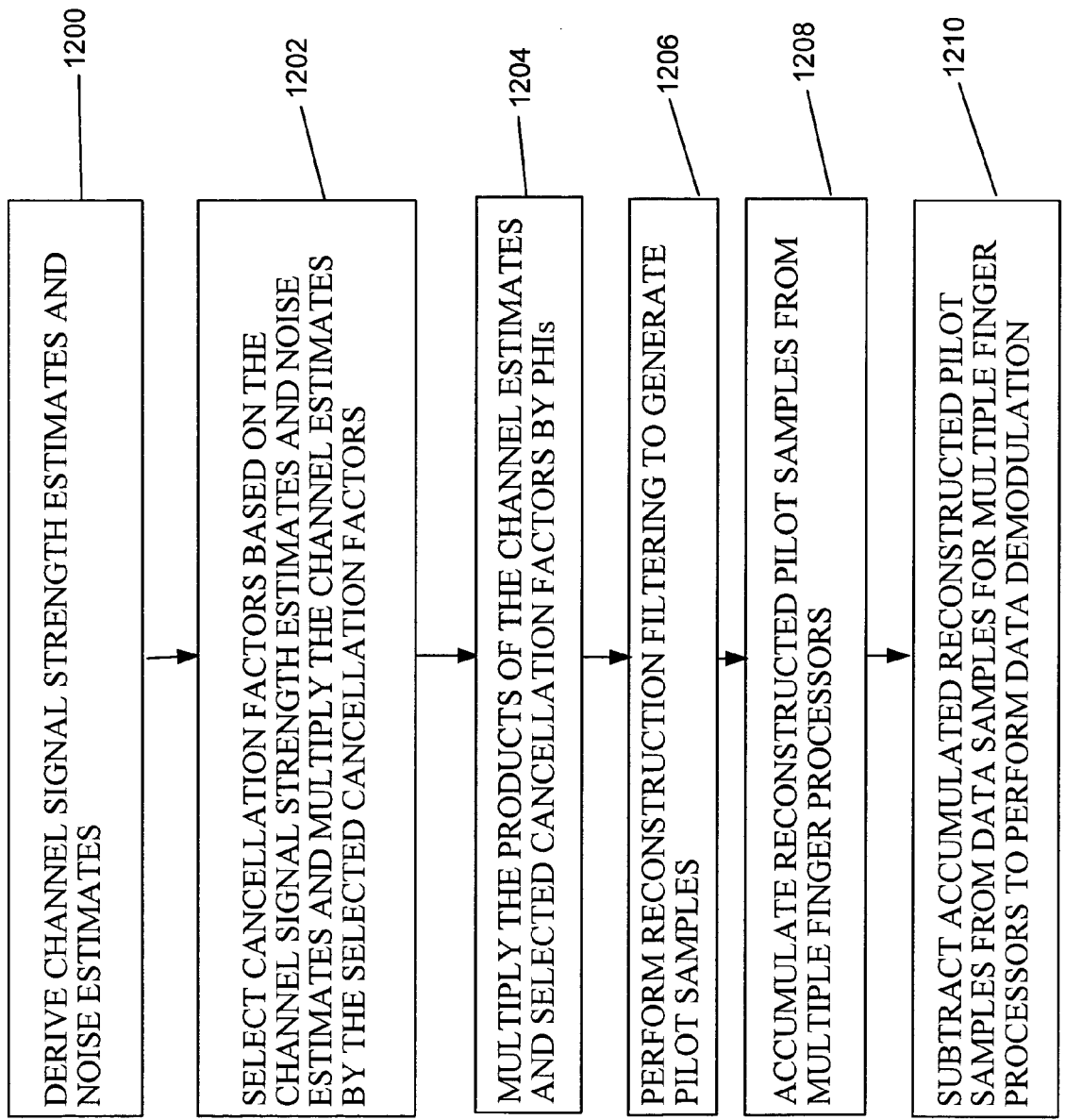
FIG. 12A is a flow diagram of another embodiment of a process to derive accumulated pilot interference for a number of multipaths.

FIG. 12A is a flow diagram that summarizes the process described above with FIGS. 9-11 for deriving and accumulating pilot interference for a plurality of multipaths. In block 1200, multiple finger processors 900 derive channel signal strength estimates and noise estimates. In block 1202, the finger processors 900 (a) select cancellation factors based on the channel signal strength estimates and noise estimates and (b) multiply the channel estimates by the selected cancellation factors. In block 1204, the finger processors 900 multiply the products of the channel estimates and selected cancellation factors by $\phi$ from the reconstruction filter table 930. In block 1206, the finger processors 900 perform reconstruction filtering to generate pilot samples. In block 1208, a single accumulation buffer 928 stores reconstructed pilot samples from multiple finger processors 900, e.g., at chip×8 or chip×2. In block 1210, the accumulated reconstructed pilot samples are subtracted from data samples for multiple finger processors to perform data demodulation.

FIG. 12B is a flow diagram of another embodiment of a process to derive accumulated pilot interference for a number of multipaths, in which filtering and pilot interference accumulation are switched in order compared to FIG. 12A. In block 1250, multiple finger processors 900 derive channel signal strength estimates and noise estimates. In block 1252, the finger processors 900 (a) select cancellation factors based on the channel signal strength estimates and noise estimates and (b) multiply the channel estimates by the selected cancellation factors. In block 1254, the finger processors 900 use products of channel estimates and selected cancellation factors to reconstruct pilot samples. In block 1256, a single accumulation buffer 928 stores reconstructed pilot samples from multiple finger processors 900, e.g., at chip×8 or chip×2. In block 1258, a single reconstruction filtering block filters the pilot samples from the accumulation buffer 928 by $\phi$. In block 1260, the accumulated reconstructed pilot samples are subtracted from data samples for multiple finger processors to perform data demodulation.

In FIG. 12B, filtering is performed after accumulating reconstructed pilot interference samples from multiple finger processors 900 and before subtracting pilot interference from the data samples. Each finger processor 900 would not have to perform filtering. This may reduce the complexity of each finger processor 900.

Equations

An actual total pilot interference signal $\tilde{p}(n)$ (complex value) of a received reverse link (RL) signal may be expressed as:

$$\tilde{p}(n) = \sum_{k=1}^{K} \sum_{l=1}^{L} \sum_{i} \tilde{h}_l^k(i) \tilde{c}^k(i) \phi[nT_s - iNT_s - \tau_l^k]$$

where n represents a segment of the received signal (for example, n may have a sample rate equal to chip rate×2);

K is a total number of users or terminals contributing to segment n of the received signal;

L is a total number of multipaths contributing to segment n of the received signal;

i refers to a time index;

$\tilde{h}_l^k(i)$ is an estimated complex channel coefficient of the $k^{th}$ user's $l^{th}$ path;

$\tilde{c}^k(i)$ is equal to the product of the $k^{th}$ user's complex PN-sequence p and the pilot channelization code $C_{pilot}$; since the pilot channelization code $C_{pilot}$ is a series of ones in some CDMA systems, such as CDMA 2000, $\tilde{c}^k(i)$ is equal to the $k^{th}$ user's complex PN-sequence p;

$\phi$ is a convolution (FIG. 14) of the transmit pulse $\phi_{TX}$ (from filters 352a, 352b in FIG. 3) and the receiver filter $\phi_{RX}$ (in receiver 252 in FIG. 2), e.g., a low pass filter; as stated above, the convolution may be at chip×8 resolution in one embodiment;

$T_s$ is a sampling period;

N is a number of samples per chip; and $\tau_l^k$ is a path delay of the $k^{th}$ user's $l^{th}$ path.

A rake receiver with a plurality of M finger processors 900 (FIG. 9) may derive a total reconstructed pilot interference signal (also called a pilot interference "replica" or "estimate") expressed as:

$$\hat{p}(n) = \sum_{m=1}^{M} \sum_{i} \hat{h}^m(i) \tilde{c}^m(i) \phi[nT_s - iNT_s - \hat{\tau}^m]$$

where M is a total number of finger processors to process multipaths;

$\hat{h}^m(i)$ is an estimated complex channel coefficient of the $m^{th}$ finger processor;

$\tilde{c}^m(i)$ is a complex PN-sequence used by the $m^{th}$ finger processor; and $\hat{\tau}^m$ is an estimated path delay of the $m^{th}$ finger.

The total reconstructed pilot interference signal $\hat{p}(n)$ may be expressed as a sum of individual reconstructed pilot interference signals $\hat{p}^m(n)$ derived by each finger processor 900:

$$\hat{p}(n) = \sum_{m=1}^{M} \hat{p}^m(n).$$

Each reconstructed pilot interference signal derived by a finger processor 900 may be expressed as:

$$\hat{p}^m(n) = \sum_i \hat{\tilde{h}}^m(i)\tilde{c}^m(i)\hat{\phi}[nT_s - iNT_s - \hat{\tau}^m].$$

If the estimated complex channel coefficient $\hat{\tilde{h}}^m$ is presumed constant over one segment, then the equation above may be rewritten as:

$$\hat{p}^m(n) = \hat{\tilde{h}}^m \sum_i (i)\tilde{c}^m(i)\hat{\phi}[nT_s - iNT_s - \hat{\tau}^m]$$

$$= \hat{\tilde{h}}^m \tilde{\Phi}^m(n)$$

where $\tilde{\Phi}^m(n)$ is the complex reconstructed MF (matched filter) sample of the $m^{th}$ finger. The estimated complex channel coefficient $\hat{\tilde{h}}^m$ may be provided by the multiplier 926 in FIG. 9, and $\tilde{\Phi}^m(n)$ may be provided by the filter table 938, multiplier 932, pilot channelizer 934, spreader 936 and pilot reconstruction filtering block 930 of FIG. 9.

The order of processes shown in FIG. 9 may vary in other embodiments. One variation of the process shown in FIG. 9 may process a pulse shape of φ(t) and I and Q PN sequence p to generate I and Q reconstructed samples $\tilde{\Phi}^m(n)$. The I reconstructed samples $\tilde{\Phi}^m(n)$ are then multiplied by I and Q components of the complex channel estimate $\hat{\tilde{h}}^m$. Similarly, the Q reconstructed samples $\tilde{\Phi}^m(n)$ are multiplied by the I and Q components of the complex channel estimate $\hat{\tilde{h}}^m$. Then an optional phase rotation may be performed on the I and Q $\hat{\tilde{h}}^m\tilde{\Phi}^m(n)$ samples. Then the I and Q $\hat{\tilde{h}}^m\tilde{\Phi}^m(n)$ samples may be multiplied by a selected cancellation factor $\alpha_m$ and accumulated in the accumulation buffer 928. Thus, the cancellation factor $\alpha_m$ may be implemented after filtering (on the output of filtering block 930) instead of before filtering (FIG. 9).

Multiple Antennas

Figure 13A:
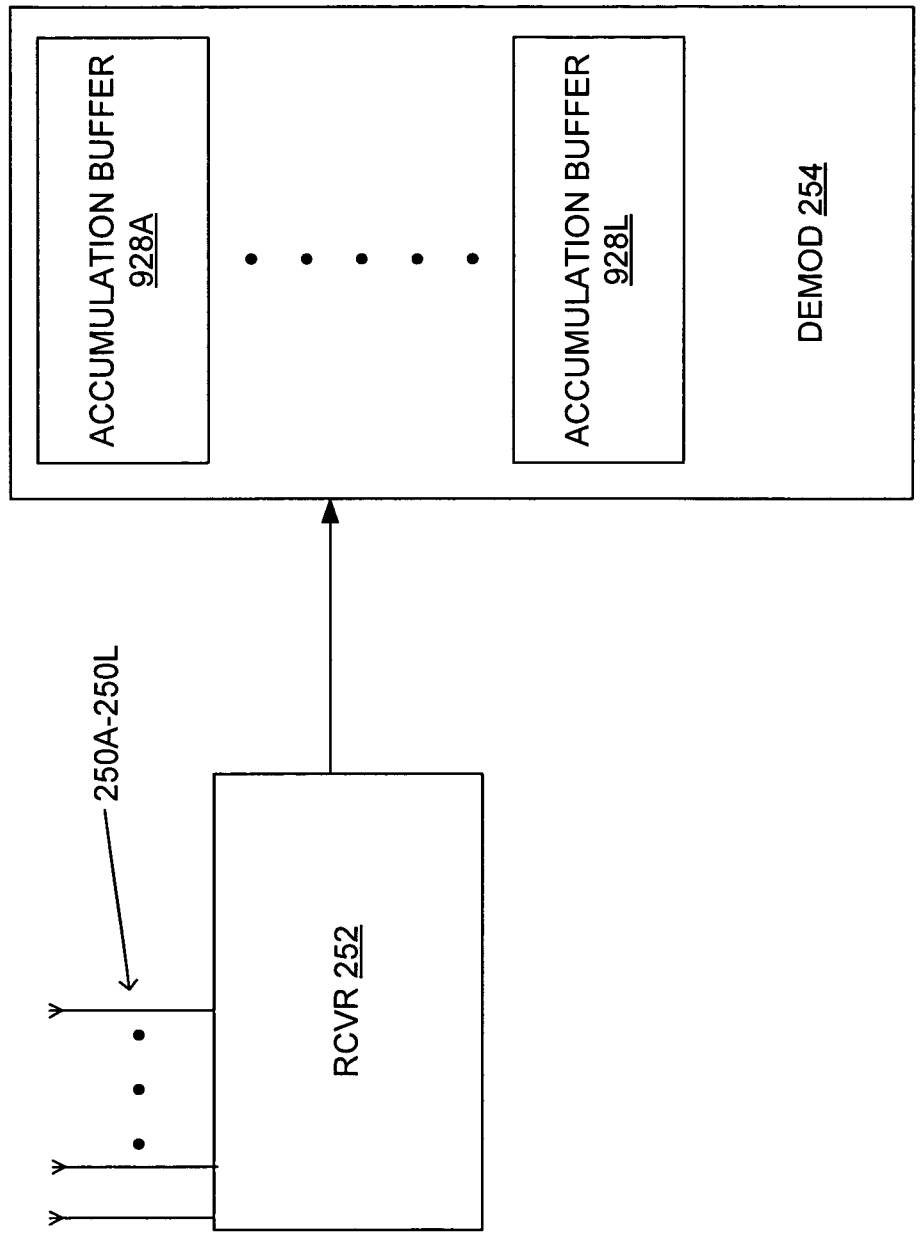
FIG. 13A is a block diagram of a receiver with a plurality of antennas and a demodulator with a plurality of interference accumulation buffers.

FIG. 13A is a block diagram of a receiver 252 (FIG. 2) with a plurality of antennas 250A-250L, e.g., 12 antennas, and a demodulator 254 with a plurality of interference accumulation buffers 928A-928L (FIG. 9), e.g., 12 interference accumulation buffers. Each interference accumulation buffer 928 stores reconstructed pilots for a different antenna 250.

Figure 13B:
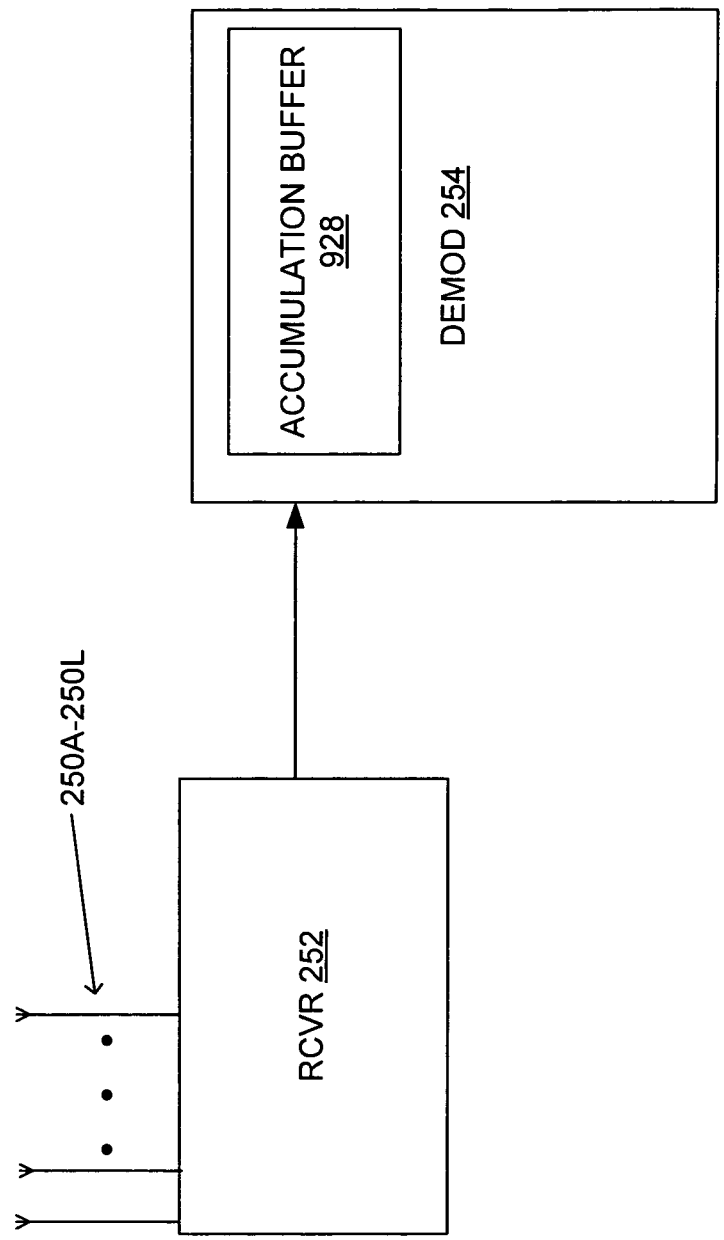
FIG. 13B is a block diagram of a receiver with a plurality of antennas and a demodulator with a single interference accumulation buffer.

FIG. 13B is a block diagram of a receiver 252 (FIG. 2) with a plurality of antennas 250A-250L, e.g., 12 antennas, and a demodulator 254 with a single interference accumulation buffer 928, which stores reconstructed pilots for some or all of the antennas 250A-250L. In this embodiment, the finger processors 900 reconstruct all pilot interference for one antenna 250 and store the pilot interference in the interference accumulation buffer 928. Then the finger processors 900 reconstruct all pilots for another antenna by shifting PN sequences (and maybe some additional processing) and store the pilot interference in the interference accumulation buffer 928. The finger processors 900 continue until all pilots from some or all of the antennas 250 are reconstructed and stored in the interference accumulation buffer 928. The reconstructed pilots are aligned at system time and stored in the single interference accumulation buffer 928. By using a single interference accumulation buffer 928, this embodiment may reduce memory requirements by 6-12 times.

The pilot interference cancellation techniques described herein may provide a noticeable improvement in performance. As stated above, a pilot transmitted by each terminal on the reverse link contributes to total channel interference, $I_o$, in a similar manner as background noise, $N_o$. Pilots transmitted from all terminals may represent a substantial part of the total interference level seen by all terminals and base stations. This would then result in a lower signal-to-total-noise-plus-interference ratio (SNR) for each individual terminal. In fact, it is estimated that in a cdma2000 system (which supports pilots on the reverse link) operating near capacity, approximately half of the interference seen at a base station may be due to pilots from transmitting terminals. Cancellation or reduction of multi-terminal and multi-path pilot interference may improve the SNR of each individual terminal, which allows each terminal to transmit at a lower power level and still achieve a desirable decoding performance. Thus, pilot interference cancellation (PIC) increases the reverse link capacity, which allows higher data rates from existing terminals, e.g., a 30-35% data rate increase, or allows more terminals or users, e.g., 10-15% more users, to be added to a wireless communication system, e.g., a base station service area.

The techniques described herein for estimating and canceling pilot interference may be used in various wireless communication systems that transmit a pilot along with data. For example, these techniques may be used for various CDMA systems (e.g., IS-95, CDMA2000, CDMA 2000 1xEV-DV, CDMA 2000 1xEV-DO, WCDMA, TD-SCDMA, TS-CDMA, etc.), Personal Communication Services (PCS) systems (e.g., ANSI J-STD-008), and other wireless communication systems. The techniques described herein may be used to estimate and cancel pilot interference in cases where multiple instances (multipaths) of each of one or more transmitted signals are received and processed (e.g., by a rake receiver or some other demodulator) and also in cases where multiple transmitted signals are received and processed.

For clarity, various aspects and embodiments have been described for the reverse link in cdma2000. The pilot interference cancellation techniques described herein may also be used for the forward link from the base station to the terminal. The processing by the demodulator is determined by the particular CDMA standard being supported and whether the inventive techniques are used for the forward or reverse link. For example, the "despreading" with a spreading sequence in IS-95 and cdma2000 is equivalent to the "descrambling" with a scrambling sequence in W-CDMA, and the channelization with a Walsh code or a quasi-orthogonal function (QOF) in IS-95 and cdma2000 is equivalent to the "despreading" with an OVSF code in W-CDMA. In general, the processing performed by the demodulator at the receiver is complementary to that performed by the modulator at the transmitter unit.

For the forward link, the techniques described herein may also be used to approximately cancel other pilots that may be transmitted in addition to, or possibly in place of, a "common" pilot transmitted to all terminals in a cell. For example, cdma2000 supports a "transmit diversity" pilot and an "auxiliary" pilot. These other pilots may utilize different Walsh codes (i.e., different channelization codes, which may be quasi-orthogonal functions). A different data pattern may also be used for the pilot. To process any of these pilots, the despread samples are decovered with the same Walsh code used to channelize the pilot at the base station, and further correlated (i.e., multiplied and accumulated) with the same pilot data pattern used at the base station for the pilot. The transmit diversity pilot and/or auxiliary pilot may be estimated and canceled in addition to the common pilot.

Similarly, W-CDMA supports a number of different pilot channels. First, a common pilot channel (CPICH) may be transmitted on a primary base station antenna. Second, a diversity CPICH may be generated based on non-zero pilot data and transmitted on a diversity antenna of the base station. Third, one or more secondary CPICHs may be transmitted in a restricted part of the cell, and each secondary CPICH is generated using a non-zero channelization code. Fourth, the base station may further transmit a dedicated pilot to a specific user using the same channelization code as the user's data channel. In this case, the pilot symbols are time-multiplexed with the data symbols to that user. Accordingly, it will be understood by those skilled in the art that the techniques described herein are applicable for processing all of the above different types of pilot channels, and other pilot channels that may also be transmitted in a wireless communication system.

The demodulator 254 (FIG. 2) and other processing units that may be used to implement various aspects and embodiments may be implemented in hardware, software, firmware, or a combination thereof. For a hardware design, the demodulator (including the data demodulation unit and the elements used for pilot interference estimation and cancellation such as the pilot estimator and the pilot interference estimator), and other processing units may be implemented within one or more application specific integrated circuits (ASIC), digital signal processors (DSPs), digital signal processing devices (DSPDs), field programmable gate arrays (FPGAs), processors, microprocessors, controllers, microcontrollers, programmable logic devices (PLD), other electronic units, or any combination thereof.

For a software implementation, the elements used for pilot interference estimation and cancellation and data demodulation may be implemented with modules (e.g., procedures, functions, and so on) that perform the functions described herein. The software codes may be stored in a memory unit (e.g., memory 262 in FIG. 2) and executed by a processor (e.g., controller 260). The memory unit may be implemented within the processor or external to the processor, in which case it can be communicatively coupled to the processor via various means as it known in the art.

The elements used to implement the pilot interference estimation and cancellation described herein may be incorporated in a receiver unit or a demodulator that may further be incorporated in a terminal (e.g., a handset, a handheld unit, a stand-alone unit, and so on), a base station, or some other communication devices or units. The receiver unit or demodulator may be implemented with one or more integrated circuits.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A receiver unit configured to receive a wireless signal comprising at least first and second signal instances, each signal instance comprising data and a pilot signal, the receiver unit comprising:
a processor configured to:
determine a first channel estimate for the first signal instance;
use the first channel estimate and a spread pilot signal associated with the first signal instance to estimate a first pilot of the first signal instance;
determine a second channel estimate for the second signal instance; and
use the second channel estimate and a spread pilot signal associated with the second signal instance to estimate a second pilot of the second signal instance; and
a buffer configured to accumulate the estimated first and second pilots, the processor being configured to subtract the accumulated, estimated first and second pilots from the received signal to estimate a pilot-canceled received signal, the processor being configured to use the estimated pilot-canceled received signal to demodulate data of the first signal instance,
wherein the buffer is further configured to accumulate (a) the estimated first pilot according to a first estimated time offset of the first signal instance and (b) the estimated second pilot according to a second estimated time offset of the second signal instance.

2. A receiver unit configured to receive a wireless signal comprising at least first and second signal instances, each signal instance comprising data and a pilot signal, the receiver unit comprising:
a processor configured to:
determine a first channel estimate for the first signal instance;
use the first channel estimate and a spread pilot signal associated with the first signal instance to estimate a first pilot of the first signal instance;
determine a second channel estimate for the second signal instance; and
use the second channel estimate and a spread pilot signal associated with the second signal instance to estimate a second pilot of the second signal instance;
a buffer configured to accumulate the estimated first and second pilots, the processor being configured to subtract the accumulated, estimated first and second pilots from the received signal to estimate a pilot-canceled received signal, the processor being configured to use the estimated pilot-canceled received signal to demodulate data of the first signal instance, and
a sample buffer configured to store the wireless signal at a sample rate equal to a multiple of a chip rate of the wireless signal.

3. The receiver unit of claim 2, wherein the sample rate of the sample buffer is equal to a sample rate of the buffer accumulating the estimated pilots.

4. A receiver unit configured to:
receive a wireless signal comprising at least first and second signal instances, each signal instance comprising data and a pilot signal, the receiver unit comprising: a processor configured to:
determine a first channel estimate for the first signal instance;
use the first channel estimate and a spread pilot signal associated with the first signal instance to estimate a first pilot of the first signal instance;
determine a second channel estimate for the second signal instance; and
use the second channel estimate and a spread pilot signal associated with the second signal instance to estimate a second pilot of the second signal instance; and a buffer configured to accumulate the estimated first and second pilots, the processor being configured to subtract the accumulated, estimated first and second pilots from the received signal to estimate a pilot-canceled received signal, the processor being configured to use the estimated pilot-canceled received signal to demodulate data of the first signal instance, and wherein the processor is further configured to:
determine a first noise estimate of the first signal instance;
derive a cancellation factor a based on the first channel estimate and the first noise estimate;
multiply the first channel estimate by the cancellation factor to produce a weighted channel estimate; and
use the weighted channel estimate and the spread pilot signal associated with the first signal instance to estimate the first pilot of the first signal instance.

5. The receiver unit of claim 4, wherein the cancellation factor a is derived from:

$$\alpha = \frac{[(|h|^2/N_t) \times N]}{[1 + (|h|^2/N_t) \times N]}$$

where h is the first channel estimate, $N_t$ is the first noise estimate, and N is a number of samples used to estimate h and $N_t$ of the first signal instance.

6. The receiver unit of claim 4, wherein the cancellation factor ranges from 0 to 1.0.

7. The receiver unit of claim 4, wherein the cancellation factor ranges from 0 to a value greater than 1.0.

8. The receiver unit of claim 4, further comprising a lookup table with sets of channel estimates and noise estimates corresponding to cancellation factors.

9. A receiver unit configured to receive a wireless signal comprising at least first and second signal instances, each signal instance comprising data and a pilot signal, the receiver unit comprising:
a processor configured to:
determine a first channel estimate for the first signal instance;
use the first channel estimate and a spread pilot signal associated with the first signal instance to estimate a first pilot of the first signal instance;
determine a second channel estimate for the second signal instance; and
use the second channel estimate and a spread pilot signal associated with the second signal instance to estimate a second pilot of the second signal instance; and
a buffer configured to accumulate the estimated first and second pilots, the processor being configured to subtract the accumulated, estimated first and second pilots from the received signal to estimate a pilot-canceled received signal, the processor being configured to use the estimated pilot-canceled received signal to demodulate data of the first signal instance, wherein the processor is further configured to:
multiply the first channel estimate by a convolution of a transmit pulse and a receive filter function; and
perform a convolution of (a) the spread pilot signal associated with the first signal instance and (b) a product of the first channel estimate and the convolution of the transmit pulse and the receive filter function to estimate the first pilot of the first signal instance.

10. The receiver unit of claim 9, wherein the transmit pulse is defined by a Code Division Multiple Access (CDMA) standard.

11. The receiver unit of claim 9, wherein the processor is configured to downsample a rate of at least one of (a) the convolution of the transmit pulse and the receive filter function, and (b) the convolution of (i) the spread pilot signal associated with the first signal instance and (ii) the product of the first channel estimate and the convolution of the transmit pulse and the receive filter function to match a rate of the buffer.

12. The receiver unit of claim 9, wherein the processor is configured to upsample a rate of at least one of (a) the convolution of the predetermined transmit pulse and the receive filter function, and (b) the convolution of (i) the spread pilot signal associated with the first signal instance and (ii) the product of the first channel estimate and the convolution of the pre-determined transmit pulse and the receive filter function to match a rate of the buffer.

13. The receiver unit of claim 9, wherein the processor is configured to:
decimate samples of the convolution of the pre-determined transmit pulse and the receive filter function according to a phase associated with an estimated time offset of the first signal instance;
multiply the first channel estimate by decimated samples of the convolution of the pre-determined transmit pulse and the receive filter function; and
perform a convolution of the spread pilot signal associated with the first signal instance and the product of the first channel estimate and the decimated samples to estimate the first pilot of the first signal instance.

14. The receiver unit of claim 9, further comprising a polyphase finite impulse response filter (FIR) configured to:
decimate samples of the convolution of the pre-determined transmit pulse and the receive filter function according to a phase associated with an estimated time offset of the first signal instance;
multiply the first channel estimate by decimated samples of the convolution of the pre-determined transmit pulse and the receive filter function; and
perform a convolution of the spread pilot signal associated with the first signal instance and the product of the first channel estimate and the decimated samples to estimate the first pilot of the first signal instance.

15. The receiver unit of claim 9, further comprising a filter table of pre-determined filter coefficients that correspond to a plurality of different phases, the processor being configured to select a phase and corresponding filter coefficients based on an estimated time offset of the first signal instance.

16. A receiver unit configured to:
receive a wireless signal comprising at least first and second signal instances, each signal instance comprising data and a pilot signal, the receiver unit comprising:
a processor configured to:
determine a first channel estimate for the first signal instance;
use the first channel estimate and a spread pilot signal associated with the first signal instance to estimate a first pilot of the first signal instance;
determine a second channel estimate for the second signal instance; and
use the second channel estimate and a spread pilot signal associated with the second signal instance to estimate a second pilot of the second signal instance; and
a buffer configured to accumulate the estimated first and second pilots, the processor being configured to subtract the accumulated, estimated first and second pilots from the received signal to estimate a pilot-canceled received signal, the processor being configured to use the estimated pilot-canceled received signal to demodulate data of the first signal instance, and wherein the processor is configured to determine the first channel estimate and use the first channel estimate and spread pilot signal associated with the first signal instance to estimate the first pilot of the first signal instance substantially in parallel with determining the second channel estimate and using the second channel estimate and spread pilot signal associated with the second signal instance to estimate the second pilot of the second signal instance.

17. A communication system comprising:
a base station configured to receive a wireless signal comprising at least first and second signal instances, each signal instance comprising data and a pilot signal, the base station comprising:
a processor configured to:
determine a first channel estimate for the first signal instance;
use the first channel estimate and a spread pilot signal associated with the first signal instance to estimate a first pilot of the first signal instance;
determine a second channel estimate for the second signal instance; and
use the second channel estimate and a spread pilot signal associated with the second signal instance to estimate a second pilot of the second signal instance; and
a memory configured to accumulate the estimated first and second pilots, the processor being configured to subtract the accumulated, estimated first and second pilots from the received signal to estimate a pilot-canceled received signal, the processor being configured to use the estimated pilot-canceled received signal to demodulate data of the first signal instance, wherein the processor is further configured to
multiply the first channel estimate by a convolution of a pre-determined transmit pulse and a receive filter function; and
perform a convolution of (a) a spread pilot signal associated with the first signal instance and (b) a product of the first channel estimate and the convolution of the pre-determined transmit pulse and the receive filter function to estimate the first pilot of the first signal instance.

18. A communication system comprising:
a base station configured to receive a wireless signal comprising at least first and second signal instances, each signal instance comprising data and a pilot signal, the base station comprising:
a processor configured to:
determine a first channel estimate for the first signal instance;
use the first channel estimate and a spread pilot signal associated with the first signal instance to estimate a first pilot of the first signal instance;
determine a second channel estimate for the second signal instance; and
use the second channel estimate and a spread pilot signal associated with the second signal instance to estimate a second pilot of the second signal instance; and
a memory configured to accumulate the estimated first and second pilots, the processor being configured to subtract the accumulated, estimated first and second pilots from the received signal to estimate a pilot-canceled received signal, the processor being configured to use the estimated pilot-canceled received signal to demodulate data of the first signal instance,
wherein the base station comprises a plurality of antennas and a plurality of buffers in the memory, each buffer being configured to accumulate the estimated pilots of signal instances received by one of the antennas.

19. A communication system comprising:
a base station configured to receive a wireless signal comprising at least first and second signal instances, each signal instance comprising data and a pilot signal, the base station comprising:
a processor configured to:
determine a first channel estimate for the first signal instance;
use the first channel estimate and a spread pilot signal associated with the first signal instance to estimate a first pilot of the first signal instance;
determine a second channel estimate for the second signal instance; and
use the second channel estimate and a spread pilot signal associated with the second signal instance to estimate a second pilot of the second signal instance; and
a memory configured to accumulate the estimated first and second pilots, the processor being configured to subtract the accumulated, estimated first and second pilots from the received signal to estimate a pilot-canceled received signal, the processor being configured to use the estimated pilot-canceled received signal to demodulate data of the first signal instance,
wherein the base station comprises a plurality of antennas, the memory having a single buffer configured to accumulate the estimated pilots of signal instances received by the plurality of the antennas.

20. A communication system comprising:
a base station configured to receive a wireless signal comprising at least first and second signal instances, each signal instance comprising data and a pilot signal, the base station comprising:
a processor configured to:
determine a first channel estimate for the first signal instance;
use the first channel estimate and a spread pilot signal associated with the first signal instance to estimate a first pilot of the first signal instance;
determine a second channel estimate for the second signal instance; and
use the second channel estimate and a spread pilot signal associated with the second signal instance to estimate a second pilot of the second signal instance; and
a memory configured to accumulate the estimated first and second pilots, the processor being configured to subtract the accumulated, estimated first and second pilots from the received signal to estimate a pilot-canceled received signal, the processor being configured to use the estimated pilot-canceled received signal to demodulate data of the first signal instance,
wherein the base station comprises X number of antennas and Y number of buffers in the memory, X being greater than Y, wherein at least one buffer is configured to accumulate estimated pilots of signal instances received by two or more antennas.

21. A method for canceling pilot interference in a wireless communication system, comprising:
receiving a wireless signal comprising at least first and second signal instances, each signal instance comprising data and a pilot signal;
determining a first channel estimate for the first signal instance;
deriving a product of the first channel estimate and a convolution of a pre-determined transmit pulse and a receive filter function;

using the product of the first channel estimate and the convolution to estimate a first pilot of the first signal instance;
determining a second channel estimate for the second signal instance;
deriving a product of the second channel estimate and the convolution of the pre-determined transmit pulse and the receive filter function;
using the product of the second channel estimate and the convolution to estimate a second pilot of the second signal instance;
accumulating the estimated first and second pilots;
subtracting the accumulated, estimated first and second pilots from the received signal to derive an estimated pilot-canceled received signal; and
buffering the received wireless signal at a sample rate equal to a multiple of a chip rate.

22. A method for canceling pilot interference in a wireless communication system, comprising:
receiving a wireless signal comprising at least first and second signal instances, each signal instance comprising data and a pilot signal;
determining a first channel estimate for the first signal instance;
deriving a product of the first channel estimate and a convolution of a pre-determined transmit pulse and a receive filter function;
using the product of the first channel estimate and the convolution to estimate a first pilot of the first signal instance;
determining a second channel estimate for the second signal instance;
deriving a product of the second channel estimate and the convolution of the pre-determined transmit pulse and the receive filter function;
using the product of the second channel estimate and the convolution to estimate a second pilot of the second signal instance;
accumulating the estimated first and second pilots; and
subtracting the accumulated, estimated first and second pilots from the received signal to derive an estimated pilot-canceled received signal,
wherein determining the first channel estimate for the first signal instance comprises:
despreading samples of the received signal with a spreading sequence associated with the first signal instance to provide despread samples;
de-channelizing the despread samples with a pilot channelization code to provide pilot symbols; and
filtering the pilot symbols to provide the first channel estimate.

23. A method for canceling pilot interference in a wireless communication system, comprising:
receiving a wireless signal comprising at least first and second signal instances, each signal instance comprising data and a pilot signal;
determining a first channel estimate for the first signal instance;
deriving a product of the first channel estimate and a convolution of a pre-determined transmit pulse and a receive filter function;
using the product of the first channel estimate and the convolution to estimate a first pilot of the first signal instance;
determining a second channel estimate for the second signal instance;
deriving a product of the second channel estimate and the convolution of the pre-determined transmit pulse and the receive filter function;
using the product of the second channel estimate and the convolution to estimate a second pilot of the second signal instance;
accumulating the estimated first and second pilots; and
subtracting the accumulated, estimated first and second pilots from the received signal to derive an estimated pilot-canceled received signal,
wherein determining the first channel estimate for the first signal instance uses a first segment of data samples from the received signal, the first estimated pilot corresponding to the first segment of data samples.

24. The method of claim 23, wherein the first segment comprises data samples for a time period of the received signal.

25. A method for canceling pilot interference in a wireless communication system, comprising:
receiving a wireless signal comprising at least first and second signal instances, each signal instance comprising data and a pilot signal;
determining a first channel estimate for the first signal instance;
deriving a product of the first channel estimate and a convolution of a pre-determined transmit pulse and a receive filter function;
using the product of the first channel estimate and the convolution to estimate a first pilot of the first signal instance;
determining a second channel estimate for the second signal instance;
deriving a product of the second channel estimate and the convolution of the pre-determined transmit pulse and the receive filter function;
using the product of the second channel estimate and the convolution to estimate a second pilot of the second signal instance;
accumulating the estimated first and second pilots;
subtracting the accumulated, estimated first and second pilots from the received signal to derive an estimated pilot-canceled received signal;
determining a noise estimate of the first signal instance;
deriving a cancellation factor based on the first channel estimate and the noise estimate of the first signal instance;
multiplying the first channel estimate by the cancellation factor to produce a weighted channel estimate; and
using the weighted channel estimate and a spread pilot signal associated with the first signal instance to estimate the first pilot of the first signal instance.

26. The method of claim 25, wherein deriving the cancellation factor $\alpha$ uses:

$$\alpha = \frac{[(|h|^2/N_t) \times N]}{[1 + (|h|^2/N_t) \times N]}$$

where h is the first channel estimate, $N_t$ is the noise estimate, and N is a number of samples used to estimate h and $N_t$ for the first signal instance.

27. A method for canceling pilot interference in a wireless communication system, comprising:
receiving a wireless signal comprising at least first and second signal instances, each signal instance comprising data and a pilot signal;

determining a first channel estimate for the first signal instance;

deriving a product of the first channel estimate and a convolution of a pre-determined transmit pulse and a receive filter function;

using the product of the first channel estimate and the convolution to estimate a first pilot of the first signal instance;

determining a second channel estimate for the second signal instance;

deriving a product of the second channel estimate and the convolution of the pre-determined transmit pulse and the receive filter function;

using the product of the second channel estimate and the convolution to estimate a second pilot of the second signal instance;

accumulating the estimated first and second pilots;

subtracting the accumulated, estimated first and second pilots from the received signal to derive an estimated pilot-canceled received signal;

decimating samples of the convolution of the pre-determined transmit pulse and the receive filter function according to a phase associated with an estimated time offset of the first signal instance;

multiplying the first channel estimate by decimated samples of the convolution of the pre-determined transmit pulse and the receive filter function; and performing a convolution of a spread pilot signal and the product of the first channel estimate and the decimated samples to estimate the first pilot of the first signal instance.

28. A method for canceling pilot interference in a wireless communication system, comprising:

receiving a wireless signal comprising at least first and second signal instances, each signal instance comprising data and a pilot signal;

determining a first channel estimate for the first signal instance;

deriving a product of the first channel estimate and a convolution of a pre-determined transmit pulse and a receive filter function;

using the product of the first channel estimate and the convolution to estimate a first pilot of the first signal instance;

determining a second channel estimate for the second signal instance;

deriving a product of the second channel estimate and the convolution of the pre-determined transmit pulse and the receive filter function;

using the product of the second channel estimate and the convolution to estimate a second pilot of the second signal instance;

accumulating the estimated first and second pilots;

subtracting the accumulated, estimated first and second pilots from the received signal to derive an estimated pilot-canceled received signal;

electing a phase based on an estimated time offset of the first signal instance;

using the selected phase to retrieve pre-determined filter coefficients, the pre-determined filter coefficients corresponding to the convolution of the pre-determined transmit pulse and the receive filter function; and multiplying the first channel estimate by the retrieved filter coefficients.

29. A method for canceling pilot interference in a wireless communication system, comprising:

receiving a wireless signal comprising at least first and second signal instances, each signal instance comprising data and a pilot signal;

determining a first channel estimate for the first signal instance;

deriving a product of the first channel estimate and a convolution of a pre-determined transmit pulse and a receive filter function;

using the product of the first channel estimate and the convolution to estimate a first pilot of the first signal instance;

determining a second channel estimate for the second signal instance;

deriving a product of the second channel estimate and the convolution of the pre-determined transmit pulse and the receive filter function;

using the product of the second channel estimate and the convolution to estimate a second pilot of the second signal instance; and accumulating the estimated first and second pilots;

subtracting the accumulated, estimated first and second pilots from the received signal to derive an estimated pilot-canceled received signal, wherein using the product of the first channel estimate and the convolution to estimate the first pilot of the first signal instance comprises performing a convolution of (a) the product of the channel estimate and the convolution and (b) a spread pilot signal associated with the first signal instance.

30. The method of claim 29, wherein the first channel estimate, the spread pilot signal associated with the first signal instance, and the first estimated pilot correspond to a first segment of the received signal, the first segment comprising data samples for a time period of the received signal.

31. The method of claim 29, wherein the spread pilot signal associated with the first signal instance has a phase corresponding to an arrival time of the first signal instance.

32. A method for canceling pilot interference in a wireless communication system, comprising:

receiving a wireless signal comprising at least first and second signal instances, each signal instance comprising data and a pilot signal;

determining a first channel estimate for the first signal instance;

deriving a product of the first channel estimate and a convolution of a pre-determined transmit pulse and a receive filter function;

using the product of the first channel estimate and the convolution to estimate a first pilot of the first signal instance;

determining a second channel estimate for the second signal instance;

deriving a product of the second channel estimate and the convolution of the pre-determined transmit pulse and the receive filter function;

using the product of the second channel estimate and the convolution to estimate a second pilot of the second signal instance;

accumulating the estimated first and second pilots;

subtracting the accumulated, estimated first and second pilots from the received signal to derive an estimated pilot-canceled received signal; and using the estimated pilot-canceled received signal to demodulate data of the first signal instance, wherein using the estimated pilot-canceled received signal to demodulate data of the first signal instance comprises:

despreading samples of the estimated pilot-canceled received signal with a spreading sequence for the first signal instance to provide despread samples;

de-channelizing the despread samples with a data channelization code to provide data symbols; and demodulating the data symbols with the first channel estimate for the first signal instance to provide demodulated data for the first signal instance.

33. A method for canceling pilot interference in a wireless communication system, comprising:

receiving a wireless signal comprising at least first and second signal instances, each signal instance comprising data and a pilot signal;

determining a first channel estimate for the first signal instance;

deriving a product of the first channel estimate and a convolution of a pre-determined transmit pulse and a receive filter function;

using the product of the first channel estimate and the convolution to estimate a first pilot of the first signal instance;

determining a second channel estimate for the second signal instance;

deriving a product of the second channel estimate and the convolution of the pre-determined transmit pulse and the receive filter function;

using the product of the second channel estimate and the convolution to estimate a second pilot of the second signal instance;

accumulating the estimated first and second pilots; and subtracting the accumulated, estimated first and second pilots from the received signal to derive an estimated pilot-canceled received signal, wherein determining the first channel estimate, deriving the product of the first channel estimate and the convolution, and using the product to estimate the first pilot of the first signal instance occurs substantially in parallel with determining the second channel estimate, deriving the product of the second channel estimate and the convolution, and using the product to estimate the second pilot of the second signal instance.

34. A method for canceling pilot interference in a wireless communication system, comprising:

receiving a wireless signal comprising at least first and second signal instances, each signal instance comprising data and a pilot signal;

determining a first channel estimate for the first signal instance;

deriving a product of the first channel estimate and a convolution of a pre-determined transmit pulse and a receive filter function;

using the product of the first channel estimate and the convolution to estimate a first pilot of the first signal instance;

determining a second channel estimate for the second signal instance;

deriving a product of the second channel estimate and the convolution of the pre-determined transmit pulse and the receive filter function;

using the product of the second channel estimate and the convolution to estimate a second pilot of the second signal instance;

accumulating the estimated first and second pilots; and subtracting the accumulated, estimated first and second pilots from the received signal to derive an estimated pilot-canceled received signal, wherein said determining the first channel estimate, deriving the product of the first channel estimate and the convolution, and using the product to estimate the first pilot of the first signal instance occurs in a time division multiplexed manner with determining the second channel estimate, deriving the product of the second channel estimate and the convolution, and using the product to estimate the second pilot of the second signal instance.

35. A method for canceling pilot interference in a wireless communication system, comprising:

receiving a wireless signal comprising at least first and second signal instances, each signal instance comprising data and a pilot signal;

determining a first channel estimate for the first signal instance;

deriving a product of the first channel estimate and a convolution of a pre-determined transmit pulse and a receive filter function;

using the product of the first channel estimate and the convolution to estimate a first pilot of the first signal instance;

determining a second channel estimate for the second signal instance;

deriving a product of the second channel estimate and the convolution of the pre-determined transmit pulse and the receive filter function;

using the product of the second channel estimate and the convolution to estimate a second pilot of the second signal instance;

accumulating the estimated first and second pilots; and subtracting the accumulated, estimated first and second pilots from the received signal to derive an estimated pilot-canceled received signal, wherein accumulating the estimated first and second pilots comprises accumulating (a) the estimated first pilot according to a first estimated time offset of the first signal instance and (b) the estimated second pilot according to a second estimated time offset of the second signal instance.

36. A method for canceling pilot interference in a wireless communication system, comprising:

receiving a wireless signal comprising at least first and second signal instances, each signal instance comprising data and a pilot signal;

determining a first channel estimate for the first signal instance;

deriving a product of the first channel estimate and a convolution of a pre-determined transmit pulse and a receive filter function;

using the product of the first channel estimate and the convolution to estimate a first pilot of the first signal instance;

determining a second channel estimate for the second signal instance;

deriving a product of the second channel estimate and the convolution of the pre-determined transmit pulse and the receive filter function;

using the product of the second channel estimate and the convolution to estimate a second pilot of the second signal instance;

accumulating the estimated first and second pilots; and subtracting the accumulated, estimated first and second pilots from the received signal to derive an estimated pilot-canceled received signal, wherein accumulating the estimated first and second pilots occurs at a pre-determined sample rate, which is equal to a sample rate of the received signal.

37. The method of claim 36, wherein the sample rate is a multiple of a chip rate.

38. An apparatus for canceling pilot interference in a wireless communication system, comprising:
- means for receiving a wireless signal comprising at least first and second signal instances, each signal instance comprising data and a pilot signal;
- means for determining a first channel estimate for the first signal instance;
- means for deriving a product of the first channel estimate and a convolution of a pre-determined transmit pulse and a receive filter function;
- means for using the product of the first channel estimate and the convolution to estimate a first pilot of the first signal instance;
- means for determining a second channel estimate for the second signal instance;
- means for deriving a product of the second channel estimate and the convolution of the pre-determined transmit pulse and the receive filter function;
- means for using the product of the second channel estimate and the convolution to estimate a second pilot of the second signal instance;
- means for accumulating the estimated first and second pilots;
- means for subtracting the accumulated, estimated first and second pilots from the received signal to derive an estimated pilot-canceled received signal; and
- means for buffering the received wireless signal at a sample rate equal to a multiple of a chip rate.

39. An apparatus for canceling pilot interference in a wireless communication system, comprising:
- means for receiving a wireless signal comprising at least first and second signal instances, each signal instance comprising data and a pilot signal;
- means for determining a first channel estimate for the first signal instance;
- means for deriving a product of the first channel estimate and a convolution of a pre-determined transmit pulse and a receive filter function;
- means for using the product of the first channel estimate and the convolution to estimate a first pilot of the first signal instance;
- means for determining a second channel estimate for the second signal instance;
- means for deriving a product of the second channel estimate and the convolution of the pre-determined transmit pulse and the receive filter function;
- means for using the product of the second channel estimate and the convolution to estimate a second pilot of the second signal instance;
- means for accumulating the estimated first and second pilots; and
- means for subtracting the accumulated, estimated first and second pilots from the received signal to derive an estimated pilot-canceled received signal,
- wherein means for determining the first channel estimate for the first signal instance uses a first segment of data samples from the received signal, the first estimated pilot corresponding to the first segment of data samples.

40. An apparatus for canceling pilot interference in a wireless communication system, comprising:
- means for receiving a wireless signal comprising at least first and second signal instances, each signal instance comprising data and a pilot signal;
- means for determining a first channel estimate for the first signal instance;
- means for deriving a product of the first channel estimate and a convolution of a pre-determined transmit pulse and a receive filter function;
- means for using the product of the first channel estimate and the convolution to estimate a first pilot of the first signal instance;
- means for determining a second channel estimate for the second signal instance;
- means for deriving a product of the second channel estimate and the convolution of the pre-determined transmit pulse and the receive filter function;
- means for using the product of the second channel estimate and the convolution to estimate a second pilot of the second signal instance; and
- means for accumulating the estimated first and second pilots;
- means for subtracting the accumulated, estimated first and second pilots from the received signal to derive an estimated pilot-canceled received signal,
- wherein means for using the product of the first channel estimate and the convolution to estimate the first pilot of the first signal instance comprises means for performing a convolution of (a) the product of the channel estimate and the convolution and (b) a spread pilot signal associated with the first signal instance.

41. An apparatus for canceling pilot interference in a wireless communication system, comprising:
- means for receiving a wireless signal comprising at least first and second signal instances, each signal instance comprising data and a pilot signal;
- means for determining a first channel estimate for the first signal instance;
- means for deriving a product of the first channel estimate and a convolution of a pre-determined transmit pulse and a receive filter function;
- means for using the product of the first channel estimate and the convolution to estimate a first pilot of the first signal instance;
- means for determining a second channel estimate for the second signal instance;
- means for deriving a product of the second channel estimate and the convolution of the pre-determined transmit pulse and the receive filter function;
- means for using the product of the second channel estimate and the convolution to estimate a second pilot of the second signal instance;
- means for accumulating the estimated first and second pilots; and
- means for subtracting the accumulated, estimated first and second pilots from the received signal to derive an estimated pilot-canceled received signal,
- wherein determining the first channel estimate, deriving the product of the first channel estimate and the convolution, and using the product to estimate the first pilot of the first signal instance occurs substantially in parallel with determining the second channel estimate, deriving the product of the second channel estimate and the convolution, and using the product to estimate the second pilot of the second signal instance.

42. An apparatus for canceling pilot interference in a wireless communication system, comprising:
- means for receiving a wireless signal comprising at least first and second signal instances, each signal instance comprising data and a pilot signal;
- means for determining a first channel estimate for the first signal instance;

means for deriving a product of the first channel estimate and a convolution of a pre-determined transmit pulse and a receive filter function;
means for using the product of the first channel estimate and the convolution to estimate a first pilot of the first signal instance;
means for determining a second channel estimate for the second signal instance;
means for deriving a product of the second channel estimate and the convolution of the pre-determined transmit pulse and the receive filter function;
means for using the product of the second channel estimate and the convolution to estimate a second pilot of the second signal instance;
means for accumulating the estimated first and second pilots; and
means for subtracting the accumulated, estimated first and second pilots from the received signal to derive an estimated pilot-canceled received signal,
wherein said determining the first channel estimate, deriving the product of the first channel estimate and the convolution, and using the product to estimate the first pilot of the first signal instance occurs in a time division multiplexed manner with determining the second channel estimate, deriving the product of the second channel estimate and the convolution, and using the product to estimate the second pilot of the second signal instance.

43. An apparatus for canceling pilot interference in a wireless communication system, comprising:
means for receiving a wireless signal comprising at least first and second signal instances, each signal instance comprising data and a pilot signal;
means for determining a first channel estimate for the first signal instance;
means for deriving a product of the first channel estimate and a convolution of a pre-determined transmit pulse and a receive filter function;
means for using the product of the first channel estimate and the convolution to estimate a first pilot of the first signal instance;
means for determining a second channel estimate for the second signal instance;
means for deriving a product of the second channel estimate and the convolution of the pre-determined transmit pulse and the receive filter function;
means for using the product of the second channel estimate and the convolution to estimate a second pilot of the second signal instance;
means for accumulating the estimated first and second pilots; and
means for subtracting the accumulated, estimated first and second pilots from the received signal to derive an estimated pilot-canceled received signal,
wherein means for accumulating the estimated first and second pilots comprises means for accumulating (a) the estimated first pilot according to a first estimated time offset of the first signal instance and (b) the estimated second pilot according to a second estimated time offset of the second signal instance.

44. An apparatus for canceling pilot interference in a wireless communication system, comprising:
means for receiving a wireless signal comprising at least first and second signal instances, each signal instance comprising data and a pilot signal;
means for determining a first channel estimate for the first signal instance;
means for deriving a product of the first channel estimate and a convolution of a pre-determined transmit pulse and a receive filter function;
means for using the product of the first channel estimate and the convolution to estimate a first pilot of the first signal instance;
means for determining a second channel estimate for the second signal instance;
means for deriving a product of the second channel estimate and the convolution of the pre-determined transmit pulse and the receive filter function;
means for using the product of the second channel estimate and the convolution to estimate a second pilot of the second signal instance;
means for accumulating the estimated first and second pilots; and
means for subtracting the accumulated, estimated first and second pilots from the received signal to derive an estimated pilot-canceled received signal,
wherein accumulating the estimated first and second pilots occurs at a pre-determined sample rate, which is equal to a sample rate of the received signal.

45. A non-transitory computer-readable medium, comprising codes for performing a method for canceling pilot interference in a wireless communication system, the method comprising:
receiving a wireless signal comprising at least first and second signal instances, each signal instance comprising data and a pilot signal;
determining a first channel estimate for the first signal instance;
deriving a product of the first channel estimate and a convolution of a pre-determined transmit pulse and a receive filter function;
using the product of the first channel estimate and the convolution to estimate a first pilot of the first signal instance;
determining a second channel estimate for the second signal instance;
deriving a product of the second channel estimate and the convolution of the pre-determined transmit pulse and the receive filter function;
using the product of the second channel estimate and the convolution to estimate a second pilot of the second signal instance;
accumulating the estimated first and second pilots;
subtracting the accumulated, estimated first and second pilots from the received signal to derive an estimated pilot-canceled received signal; and
buffering the received wireless signal at a sample rate equal to a multiple of a chip rate.

46. A non-transitory computer-readable medium, comprising codes for performing a method for canceling pilot interference in a wireless communication system, the method comprising:
receiving a wireless signal comprising at least first and second signal instances, each signal instance comprising data and a pilot signal;
determining a first channel estimate for the first signal instance;
deriving a product of the first channel estimate and a convolution of a pre-determined transmit pulse and a receive filter function;
using the product of the first channel estimate and the convolution to estimate a first pilot of the first signal instance;

determining a second channel estimate for the second signal instance;
deriving a product of the second channel estimate and the convolution of the pre-determined transmit pulse and the receive filter function;
using the product of the second channel estimate and the convolution to estimate a second pilot of the second signal instance;
accumulating the estimated first and second pilots; and
subtracting the accumulated, estimated first and second pilots from the received signal to derive an estimated pilot-canceled received signal,
wherein determining the first channel estimate for the first signal instance uses a first segment of data samples from the received signal, the first estimated pilot corresponding to the first segment of data samples.

47. A non-transitory computer-readable medium, comprising codes performing a method for canceling pilot interference in a wireless communication system, the method comprising:
receiving a wireless signal comprising at least first and second signal instances, each signal instance comprising data and a pilot signal;
determining a first channel estimate for the first signal instance;
deriving a product of the first channel estimate and a convolution of a pre-determined transmit pulse and a receive filter function;
using the product of the first channel estimate and the convolution to estimate a first pilot of the first signal instance;
determining a second channel estimate for the second signal instance;
deriving a product of the second channel estimate and the convolution of the pre-determined transmit pulse and the receive filter function;
using the product of the second channel estimate and the convolution to estimate a second pilot of the second signal instance; and
accumulating the estimated first and second pilots;
subtracting the accumulated, estimated first and second pilots from the received signal to derive an estimated pilot-canceled received signal,
wherein using the product of the first channel estimate and the convolution to estimate the first pilot of the first signal instance comprises performing a convolution of (a) the product of the channel estimate and the convolution and (b) a spread pilot signal associated with the first signal instance.

48. A non-transitory computer-readable medium, comprising codes for performing a method for canceling pilot interference in a wireless communication system, the method comprising:
receiving a wireless signal comprising at least first and second signal instances, each signal instance comprising data and a pilot signal;
determining a first channel estimate for the first signal instance;
deriving a product of the first channel estimate and a convolution of a pre-determined transmit pulse and a receive filter function;
using the product of the first channel estimate and the convolution to estimate a first pilot of the first signal instance;
determining a second channel estimate for the second signal instance;
deriving a product of the second channel estimate and the convolution of the pre-determined transmit pulse and the receive filter function;
using the product of the second channel estimate and the convolution to estimate a second pilot of the second signal instance;
accumulating the estimated first and second pilots; and
subtracting the accumulated, estimated first and second pilots from the received signal to derive an estimated pilot-canceled received signal,
wherein determining the first channel estimate, deriving the product of the first channel estimate and the convolution, and using the product to estimate the first pilot of the first signal instance occurs substantially in parallel with determining the second channel estimate, deriving the product of the second channel estimate and the convolution, and using the product to estimate the second pilot of the second signal instance.

49. A non-transitory computer-readable medium, comprising codes for performing a method for canceling pilot interference in a wireless communication system, the method comprising:
receiving a wireless signal comprising at least first and second signal instances, each signal instance comprising data and a pilot signal;
determining a first channel estimate for the first signal instance;
deriving a product of the first channel estimate and a convolution of a pre-determined transmit pulse and a receive filter function;
using the product of the first channel estimate and the convolution to estimate a first pilot of the first signal instance;
determining a second channel estimate for the second signal instance;
deriving a product of the second channel estimate and the convolution of the pre-determined transmit pulse and the receive filter function;
using the product of the second channel estimate and the convolution to estimate a second pilot of the second signal instance;
accumulating the estimated first and second pilots; and
subtracting the accumulated, estimated first and second pilots from the received signal to derive an estimated pilot-canceled received signal,
wherein said determining the first channel estimate, deriving the product of the first channel estimate and the convolution, and using the product to estimate the first pilot of the first signal instance occurs in a time division multiplexed manner with determining the second channel estimate, deriving the product of the second channel estimate and the convolution, and using the product to estimate the second pilot of the second signal instance.

50. A non-transitory computer-readable medium, comprising codes for performing a method for canceling pilot interference in a wireless communication system, the method comprising:
receiving a wireless signal comprising at least first and second signal instances, each signal instance comprising data and a pilot signal;
determining a first channel estimate for the first signal instance;
deriving a product of the first channel estimate and a convolution of a pre-determined transmit pulse and a receive filter function;

using the product of the first channel estimate and the convolution to estimate a first pilot of the first signal instance;

determining a second channel estimate for the second signal instance;

deriving a product of the second channel estimate and the convolution of the pre-determined transmit pulse and the receive filter function;

using the product of the second channel estimate and the convolution to estimate a second pilot of the second signal instance;

accumulating the estimated first and second pilots; and subtracting the accumulated, estimated first and second pilots from the received signal to derive an estimated pilot-canceled received signal, wherein accumulating the estimated first and second pilots comprises accumulating (a) the estimated first pilot according to a first estimated time offset of the first signal instance and (b) the estimated second pilot according to a second estimated time offset of the second signal instance.

51. A non-transitory computer-readable medium, comprising codes for performing a method for canceling pilot interference in a wireless communication system, the method comprising:

receiving a wireless signal comprising at least first and second signal instances, each signal instance comprising data and a pilot signal;

determining a first channel estimate for the first signal instance;

deriving a product of the first channel estimate and a convolution of a pre-determined transmit pulse and a receive filter function;

using the product of the first channel estimate and the convolution to estimate a first pilot of the first signal instance;

determining a second channel estimate for the second signal instance;

deriving a product of the second channel estimate and the convolution of the pre-determined transmit pulse and the receive filter function;

using the product of the second channel estimate and the convolution to estimate a second pilot of the second signal instance;

accumulating the estimated first and second pilots; and subtracting the accumulated, estimated first and second pilots from the received signal to derive an estimated pilot-canceled received signal, wherein accumulating the estimated first and second pilots occurs at a pre-determined sample rate, which is equal to a sample rate of the received signal.

* * * * *